United States Patent
Jacobs et al.

(10) Patent No.: US 12,298,195 B2
(45) Date of Patent: May 13, 2025

(54) SENSOR APPARATUSES

(71) Applicant: SENSATA TECHNOLOGIES, INC., Attleboro, MA (US)

(72) Inventors: Frank H. Jacobs, Broekland (NL); Maarten P. Van Noorden, Linde (NL); Bart Goedegebuure, Borne (NL); Edward H. Bernhardi, Saasveld (NL); Thomas Gerjen Hendrik Kouwen, Nieuwleusen (NL)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 206 days.

(21) Appl. No.: 17/795,330

(22) PCT Filed: Jan. 28, 2021

(86) PCT No.: PCT/US2021/015557
§ 371 (c)(1),
(2) Date: Jul. 26, 2022

(87) PCT Pub. No.: WO2021/155046
PCT Pub. Date: Aug. 5, 2021

(65) Prior Publication Data
US 2023/0085965 A1      Mar. 23, 2023

Related U.S. Application Data

(60) Provisional application No. 62/967,567, filed on Jan. 29, 2020.

(51) Int. Cl.
*G01L 1/26* (2006.01)
*G01L 1/04* (2006.01)

(52) U.S. Cl.
CPC .............. *G01L 1/26* (2013.01); *G01L 1/044* (2013.01)

(58) Field of Classification Search
CPC ................................. G01L 1/26; G01L 1/044
See application file for complete search history.

(56) References Cited

U.S. PATENT DOCUMENTS 5,287,757 A * 2/1994 Polaert .................... G01L 1/26
73/862.627
9,714,875 B2 * 7/2017 Ayon ....................... G01L 1/16
(Continued)

FOREIGN PATENT DOCUMENTS

| CN | 107655597 A * | 2/2018 |
| DE | 4111118 A1 | 10/1992 |

(Continued)

OTHER PUBLICATIONS

International Search Report and Written Opinion, PCT/US2021/015557, Jul. 1, 2021, 15 pages.

*Primary Examiner* — Jamel E Williams
(74) *Attorney, Agent, or Firm* — Mark H. Williams

(57) ABSTRACT

In a particular embodiment, a force sensor apparatus is disclosed that includes a sensor housing and a sensing assembly. In this particular embodiment, the sensing assembly includes a force-compliant element having a center portion and an outer portion; one or more sensing elements coupled to the center portion of the force-compliant element; and a flexible spring element having an outer diameter and a center portion. According to at least one embodiment of the present disclosure, the flexible spring element curves from the outer diameter to the center portion of the flexible spring element and the center portion of the flexible spring element is aligned with the center portion of the force-compliant element. In this embodiment, the outer diameter is separated from a ledge of the outer portion of the force-compliant element by a space.

18 Claims, 17 Drawing Sheets

(56) References Cited

U.S. PATENT DOCUMENTS

2011/0298705 A1    12/2011  Vaganov
2013/0014595 A1    1/2013  Huizinga et al.
2017/0343430 A1*  11/2017  Caltabiano ................ G01L 1/18
2022/0011178 A1*  1/2022  Wade .................... G01L 1/2231

FOREIGN PATENT DOCUMENTS

EP        2546625 A1 *  1/2013  ............. B60T 13/66
EP        3933365 A1 *  1/2022  ............. G01L 1/148
KR     101953454 B1 *  2/2019

\* cited by examiner

SENSOR APPARATUSES

BACKGROUND

Force sensors are often used to control or regulate a force that is applied to a component. In one type of force sensor, the force sensor is positioned in such a way that forces to be measured act on the sensor. The force sensor may be configured to transform a measurement of forces into an electrical signal for further use in the control or regulation of the forces. This type of force sensor may be used in a variety of applications, such as for measuring braking force of electromechanical brakes in automobiles. For example, a force-compliant element of the force sensor may be coupled to some component of the braking system and as forces are applied, the force-compliant element temporarily deforms. In this example, the strain on the force-compliant element may be measured and used to generate an electrical signal that is indicative of the forces acting on the component of the braking system.

With this type of sensor, parasitic forces, such as side-loading or non-concentric supporting areas, can lead to the load being non-uniform. Non-uniform loads may result in a shift of the strain field position on the force-compliant element of the force sensor, which will affect the accuracy of the force sensor and can increase the stresses/strains in the silicon glass which may be used to bond the sensing elements of the sensor. The components of a force sensor may also be damaged by overloading.

SUMMARY OF INVENTION

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

In a particular embodiment of the present disclosure, a force sensor apparatus is disclosed that includes a sensor housing and a sensing assembly. In this particular embodiment, the sensing assembly includes a force-compliant element, one or more sensing elements coupled to the center portion of the force-compliant element, and a flexible spring element. According to at least one embodiment of the present disclosure, the flexible spring element curves from the outer diameter to the center portion of the flexible spring element and the center portion of the flexible spring element is aligned with the center portion of the force-compliant element. In this embodiment, the outer diameter is separated from a ledge of the outer portion of the force-compliant element by a space. The flexible spring element is configured to bend in response to a force within a range being applied to the outer diameter, such that the outer diameter moves within the space towards the ledge as the force is transferred from the outer diameter to the center portion of the flexible spring element and applied to the center portion of the force-compliant element until additional force in excess of the range is applied to the outer diameter causing the outer diameter to press against the ledge, at which point, the additional force is applied to the outer portion of the force-compliant element and the sensor housing. As will be explained below, the ledge acts as a hard stop that prevents the center portion of the spring element from pressing further against the center portion of the force-compliant element. In this example embodiment, the force-compliant element is configured to deform in response to the application of force from the center portion of the flexible spring element. According to this embodiment, the one or more sensing elements generate one or more signals indicating a degree that the force-compliant element has deformed in response to the application of force from the center portion of the flexible spring element.

As will be explained further below, one advantage of using an integrated spring element having a hard stop is that the force-compliant element may be protected from overloading and the risk of introducing side-loading into the force-compliant element may be reduced.

In a particular embodiment, a force sensor apparatus includes a sensor housing, a connector inserted in the sensor housing, a weld ring compressed between the sensor housing and the connector, and a sensing assembly coupled to the sensor housing. In this embodiment, the sensing assembly includes a force-compliant element having a center portion and an outer portion. The one or more sensing elements are coupled to the center portion of the force-compliant element. The force-compliant element deforms in response to an application of force to the force-compliant element and the one or more sensing elements generate one or more signals indicating a degree that the force-compliant element has deformed in response to the application of force to the force-compliant element.

As will be explained below, the weld ring may be used to decouple the (high) force needed to environmentally seal a sensor apparatus and the (low) force needed to electrically connect the connector to the electrical components, so that both environmental sealing and electrical compression can be much more controlled. This may greatly extend the possible tolerances between components allowing cost reductions and increasing component selection freedom (e.g., O-rings, spring, etc.). Another benefit is that due to the decoupling of forces, the connector-to-housing assembly can be significantly more rigid. This can allow higher mounting forces and reduce parasitic effects from wiring harness variation. Furthermore, the design of the sensor assembly allows for improved welding capability due to gap reduction by the weld ring.

In a particular embodiment, a method of assembling a force sensor apparatus is disclosed that includes using a weld ring to compress an environmental seal between a sensor housing and a connector by inserting the connector into the sensor housing. The method also includes inserting a sensing assembly into the sensor housing. In this embodiment, the sensing assembly includes a force-compliant element having a center portion and an outer portion; and one or more sensing elements coupled to the center portion of the force-compliant element and a printed circuit board (PCB). In this particular embodiment, the force-compliant element deforms in response to an application of force to the force-compliant element and the one or more sensing elements generate one or more signals indicating a degree that the force-compliant element has deformed in response to the application of force to the force-compliant element. The method also includes coupling spring elements of the connector to the PCB of the sensing assembly. In addition, the method also includes coupling the sensing assembly to the sensor housing.

DESCRIPTION OF EMBODIMENTS

Figure 1A:
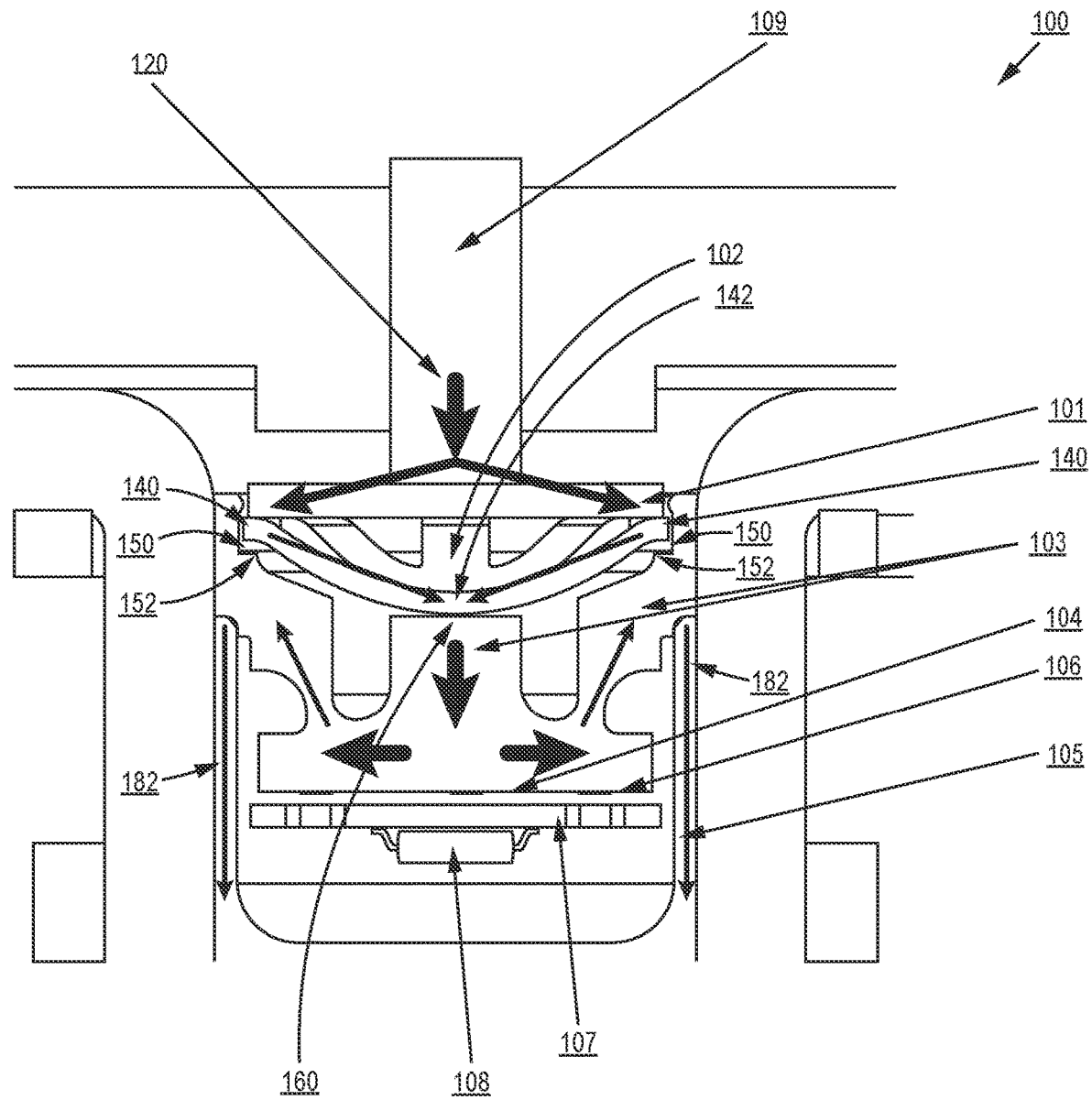
FIG. 1A is a diagram illustrating a cross-section view of a sensor apparatus with a load within normal operating range, according to at least one embodiment of the present disclosure.

The advantages, and other features of the apparatuses disclosed herein, will become more readily apparent to those having ordinary skill in the art from the following detailed description of certain embodiments taken in conjunction with the drawings which set forth representative embodiments of the present invention.

In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

Further, words defining orientation such as "upper", "lower", "inner", and "outer" are merely used to help describe the location of components with respect to one another. For example, an "inner" surface of a part is merely meant to describe a surface that is separate from the "outer" surface of that same part. No words denoting orientation are used to describe an absolute orientation (i.e., where an "inner" part must always be inside a part).

Note that techniques herein are well suited for use in any type of sensor application such as force sensor assemblies as discussed herein. However, it should be noted that embodiments herein are not limited to use in such applications and that the techniques discussed herein are well suited for other applications as well.

In force sensors, the difference between normal load (force for normal operation) and proof load (overload force which should not affect the functionality of the sensor in the normal operating range) may be a concern. In a particular embodiment, the proof force may be 500% larger force than the normal operating forces. For forces which are 5 times the operating force, it becomes a significant challenge to avoid damage to the elements of the sensor apparatus. The present disclosure describes embodiments of a force sensor apparatus that includes a spring element having a hard stop. As will be explained below, one advantage of using an integrated spring element having a hard stop is that the force-compliant element of the force sensor apparatus may be protected from overloading and the risk of introducing side-loading into the force-compliant element may be reduced.

Figure 1B:
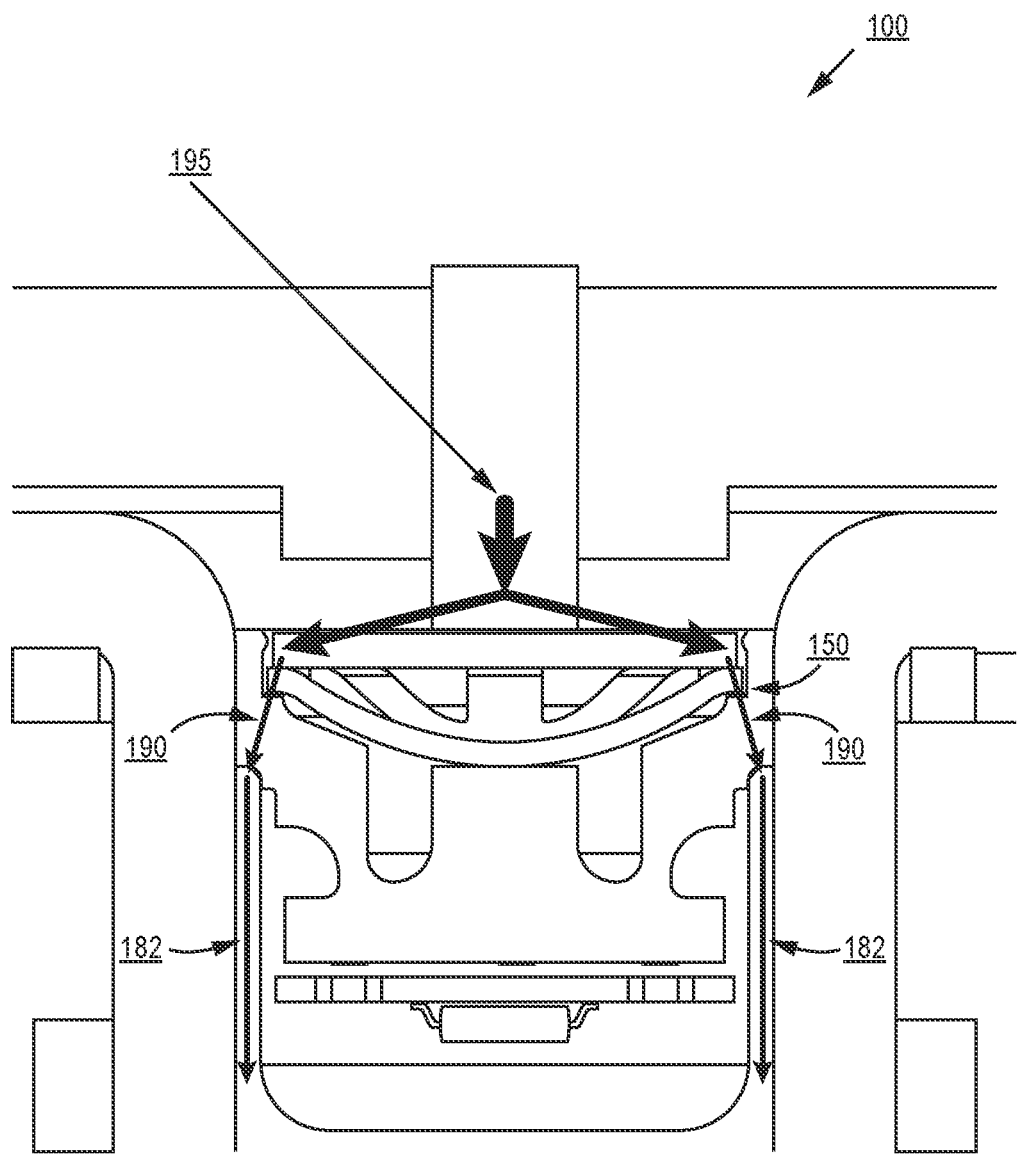
FIG. 1B is a diagram illustrating the cross-section view of the sensor apparatus of FIG. 1A with a load that exceeds the normal operating range of the sensor apparatus, according to at least one embodiment of the present disclosure.

FIG. 1A is a diagram illustrating a cross-section view of a sensor apparatus (100) having a load that is within a normal operating range, according to at least one embodiment of the present disclosure. FIG. 1B is a diagram illustrating the cross-section view of the sensor apparatus (100) of FIG. 1A having a load that exceeds the normal operating range of the sensor apparatus (100), according to at least one embodiment of the present disclosure.

The sensor apparatus (100) of FIGS. 1A and 1B includes an application specific interface (109), a sensor housing (105), a disc (101), a flexible spring element (102), a force-compliant element (103), a membrane (104), a plurality of sensing elements (106), a PCB (107), and a PCB component (108).

In the example of FIGS. 1A and 1B, the disc (101) has a first surface that is coupled to the application specific interface (109) and has a second surface that is coupled to an outer diameter (140) of the flexible spring element (102). The flexible spring element (102) also has a center portion (142) that is aligned with a center portion (160) of the force-compliant element (103) and curves from the outer diameter (140) to the center portion (142) of the flexible spring element (102). In the example of FIGS. 1A and 1B, the outer diameter (140) of the flexible spring element (102) is separated from the ledge (152) of the outer portion of the force-compliant element (103) by a space (150).

During operation, a force (120) applied to the application specific interface (109) is transferred first to the disc (101) and subsequently to the outer diameter (140) of the flexible spring element (102). The flexible spring element (102) is configured to bend in response to a force within the normal operating range being applied to the outer diameter (140) of the flexible spring element (102), such that the outer diameter (140) moves within the space (150) towards the ledge (152) as the force is transferred from the outer diameter (140) to the center portion (142) of the flexible spring element (102) and applied to the center portion (160) of the force-compliant element (103).

This application of load may result in bending of the force-compliant element (103) and a change of strains on the membrane (104). The plurality of sensing elements (106) may be attached by glass to the membrane (104) to measure the strain change on the force-compliant element (103) and the membrane (104). Each of the sensing elements (106) may be configured to generate a signal indicating the degree that the force-compliant element (103) and the membrane (104) deforms in response to the application of oppositely directed forces. In a particular embodiment, the sensing elements are micro-fused silicon strain gauges (MSG). In order to measure the amount of force applied to the force-compliant element (103), the sensing elements (106) may be evenly distributed on a circle on a top surface of the force-compliant element (103). Readers of skill in the art will realize that any number of sensing elements, placed in a variety of configurations, may be used in accordance with the present disclosure. The signals from the sensing elements (106) may be transmitted through electrical connections (not shown) to electrical components (integrated circuits, and passive elements such as resistors, capacitors, etc.) of the PCB (107).

As shown in FIG. 1B, when additional force (195) in excess of the normal operating range is applied to the outer diameter (140), the outer diameter (140) moves towards the ledge (152) of the force compliant element (103) causing the outer diameter (140) to press against the ledge (152). In this example, the contact between the outer diameter (140) of the flexible spring element (102) and the ledge (152) of the force-compliant element (103) acts as a hard stop that prevents the center portion (142) of the flexible spring element (102) from continuing to move further towards the center portion (160) of the force compliant element (103). As shown by the arrows (182, 190) in FIG. 1B, loads that exceed the normal operating range cause the spring element (102) to reach a hard stop and the forces will not be guided through the center portion of the force-compliant element to the membrane (104), but to the outer portion of the force-compliant element to the sensor housing (105). In a particular embodiment, the spring element is optimized for required protection force and desired displacement for the load.

The sensor housing (105) is designed to protect the electrical components of the force sensor apparatus (100) and receive the counterforce for force measurement. Although not pictured, the apparatus (100) of FIGS. 1A and 1B may also include an electronical connector that is aligned for positioning within an opening of the sensor housing (105).

In a particular embodiment, there is not a fixed connection between the disc (101) and the spring element (102) and/or the spring element (102) and the force-compliant element (103). Due to this, parasitic side loading into the force-sensing element will be largely reduced. In a particular embodiment, the design of the spring element (102) changes the contact shape to a point or (circular) line contact. The flexibility inside the spring element may result in a more uniform load distribution on the force-compliant element. Because the force sensor apparatus (100) of FIGS. 1A and 1B has an integrated spring element having a hard stop, the force-compliant element may be protected from overloading and the risk of introducing side-loading into the force-compliant element may be reduced.

Readers of skill in the art will realize that both the application specific interface (109) and the sensor housing (105) may be adapted and modified to integrate the apparatus (100) to any component in a new or existing assembly to either directly measure a force or measure a reaction force associated with a force. For example, in a typical brake pedal assembly, a push rod may extend from the floorboard area in front of the engine compartment. At one end of the push rod, the push rod is coupled to a swivel attached to the floorboard. A foot pedal may be attached to the other end of the push rod. At a point between the two ends of the push rod, the push rod is coupled to a piston that is coupled to the braking system. In this example brake pedal assembly, the apparatus (100) may be integrated into a variety of locations. For example, the sensor apparatus of the present disclosure may also be coupled to measure the forces at the connection between the push rod and the piston, the connection between the push rod and the floorboard, and the force that is applied to the floorboard. Alternatively, the sensor apparatus described in the present disclosure may be coupled to the brake pedal to measure either tensile or compression force applied as a user depresses the pedal.

Figure 2A:
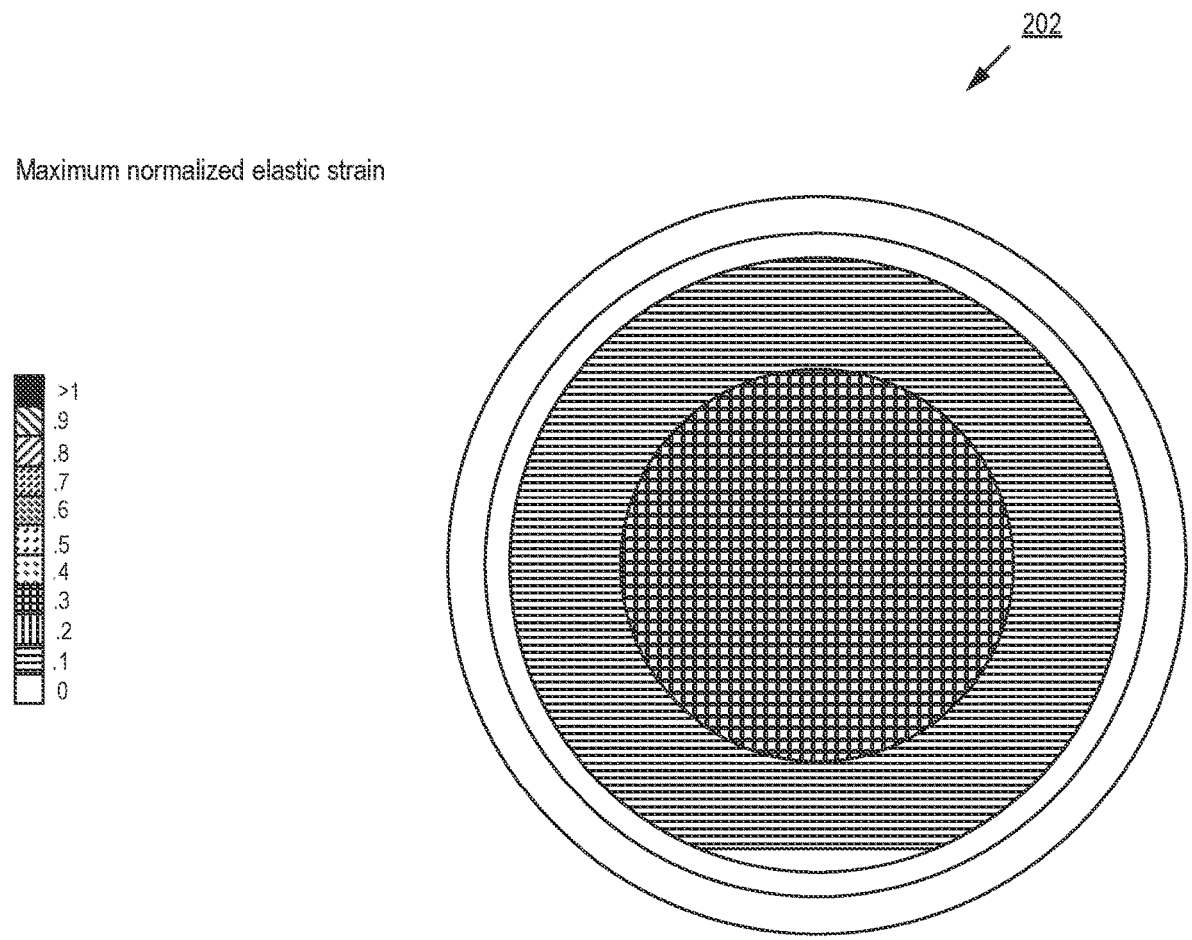
FIG. 2A is a Finite Element Analysis (FEA) diagram depicting maximum normalized elastic strains on the membrane of FIG. 1A when a load within the normal operating range of the sensor apparatus is applied to the application specific interface, according to at least one embodiment of the present disclosure.

FIG. 2A illustrates a Finite Element Analysis (FEA) diagram (202) depicting a maximum normalized elastic strains on the membrane (104) of FIG. 1A when a load within the normal operating range of the sensor apparatus (100) is applied to the application specific interface (109), according to at least one embodiment of the present disclosure. In the example of FIG. 2A, the apparatus (100) is configured to have a normal operating range, such that the spring element (102) is configured to reach a hard stop at a maximum load at the end of the normal operating range. As shown in FIG. 2A, when a normal operating load is applied to the sensor apparatus (100), the load is transferred from the application specific interface (109) to the disc (101) and from the disc (101) to the spring element (102). Because the load is within the normal operating range of the sensor apparatus (100), the spring element (102) transfers a similar load to the force-compliant element (103). This results in bending of the force-compliant element (103) and a change of strains on the membrane (104), which is shown in the FEA diagram (202) of FIG. 2A. The FEA diagram (202) of FIG. 2A shows that the elastic strains on the membrane are within acceptable limits and stay below critical thresholds.

Figure 2B:
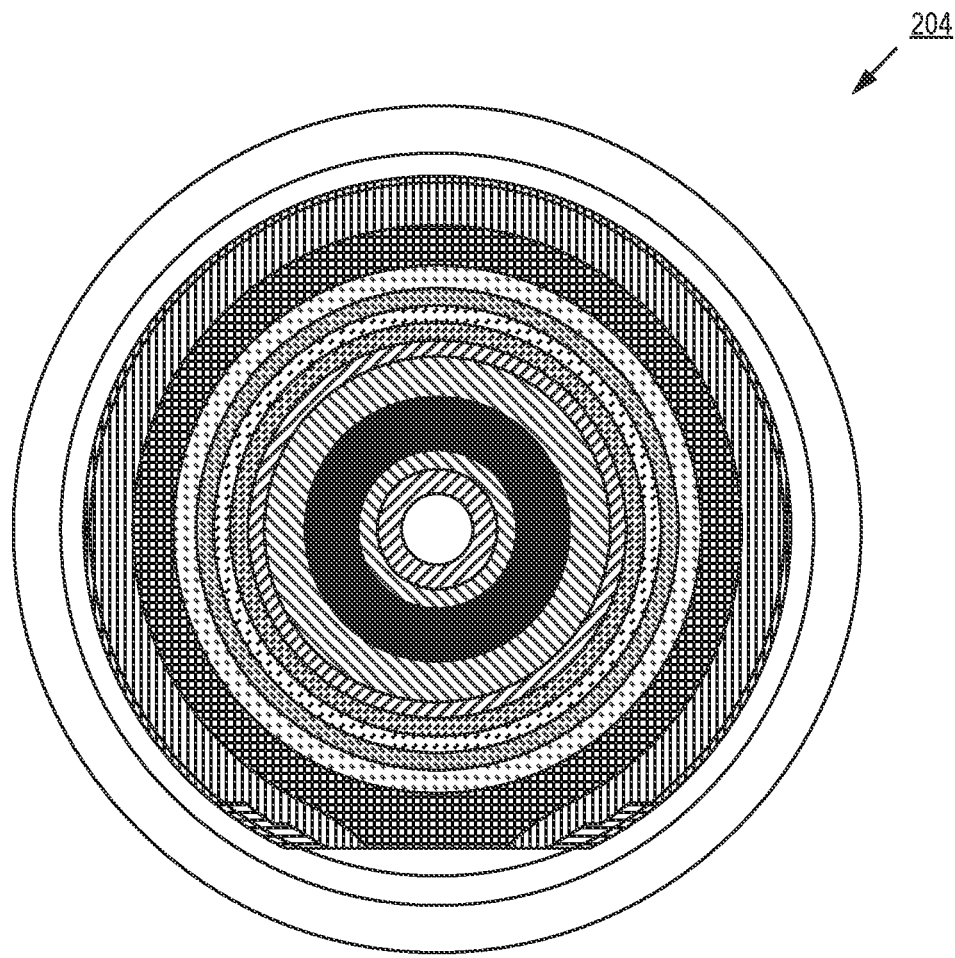
FIG. 2B is a FEA diagram depicting elastic strains on a membrane of a prior art sensor apparatus when the load exceeds the normal operating range of the prior art sensor apparatus.

FIG. 2B is a diagram illustrating a Finite Element Analysis (FEA) diagram (204) depicting elastic strains on a membrane of a prior art sensor apparatus when the load exceeds the normal operating range of the prior art sensor apparatus. The prior art sensor apparatus used in FIG. 2B is configured to have a normal operating range with a maximum load at the end of the normal operating range. The prior art sensor apparatus but does not include a disc or spring element having a hard stop. Therefore, when an operating load that exceeds the maximum load and the normal operating range is applied to the prior art sensor apparatus, there is not a spring element to stop the load from exceeding the sensor apparatus's limit. This excess strain on the prior art sensor apparatus is reflected in the FEA diagram (204) of FIG. 2B, which shows the strains on the membrane exceeding the acceptable limits and critical thresholds for the sensor apparatus. As explained above, the force-compliant element, sensing elements, and glass bond may become damaged when a force or load that exceeds the normal operating range of a prior art sensor apparatus is applied to the prior art sensor apparatus.

Figure 2C:
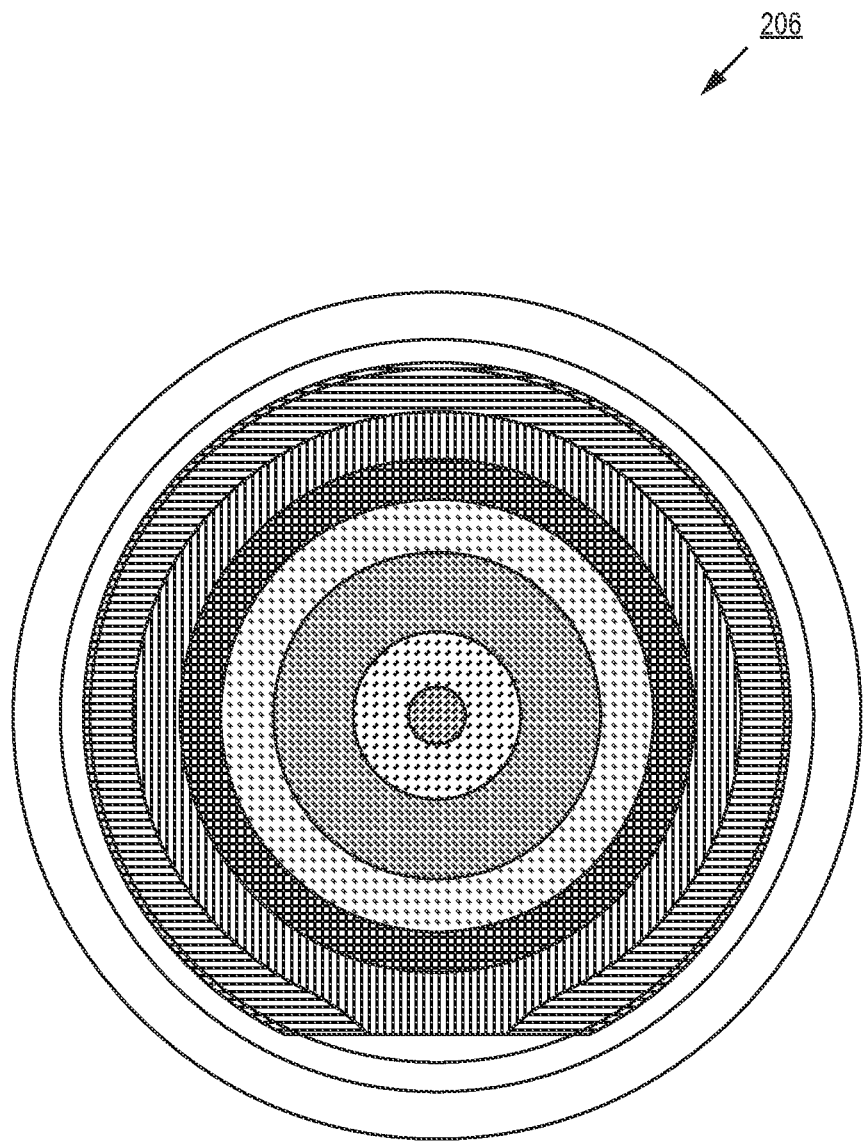
FIG. 2C is a FEA diagram depicting elastic strains on the membrane of FIG. 1B when the load that exceeds the normal operating range of the sensor apparatus is applied to the application specific interface, according to at least one embodiment of the present disclosure.

FIG. 2C is a Finite Element Analysis (FEA) diagram (206) depicting elastic strains on the membrane (104) of FIG. 1B when the load that exceeds the normal operating range of the sensor apparatus is applied to the application specific interface (109), according to at least one embodiment of the present disclosure. As shown in FIG. 2C, when an operating load that exceeds the maximum load and the normal operating range is applied to the sensor apparatus (100), the load is transferred from the application specific interface (109) to the disc (101) and from the disc (101) to the spring element (102). Because the force from the operating load on the application specific interface (109) exceeds the maximum load and the normal operating range of the force sensor apparatus, the spring element (102) will deform such that the spring element (102) will reach a hard stop at maximum load limit and the forces will not be guided through the force-compliant element (103) to the membrane (104), but through the force-compliant element to the sensor housing (105). This rerouting of forces is evident in the FEA diagram of FIG. 2C (206) when compared to the FEA diagram (204) of FIG. 2B, which does not include a spring element with a hard stop. With a hard stop and an optimized spring design for a maximum load (to reach a hard stop), the elastic strains on the membrane will reduce significantly. As shown in the FEA diagram (206) of FIG. 2C, the elastic strains stay below the critical threshold for the sensor apparatus even though the load applied to the sensor apparatus exceeds the normal operating range of the sensor apparatus.

Figure 3:
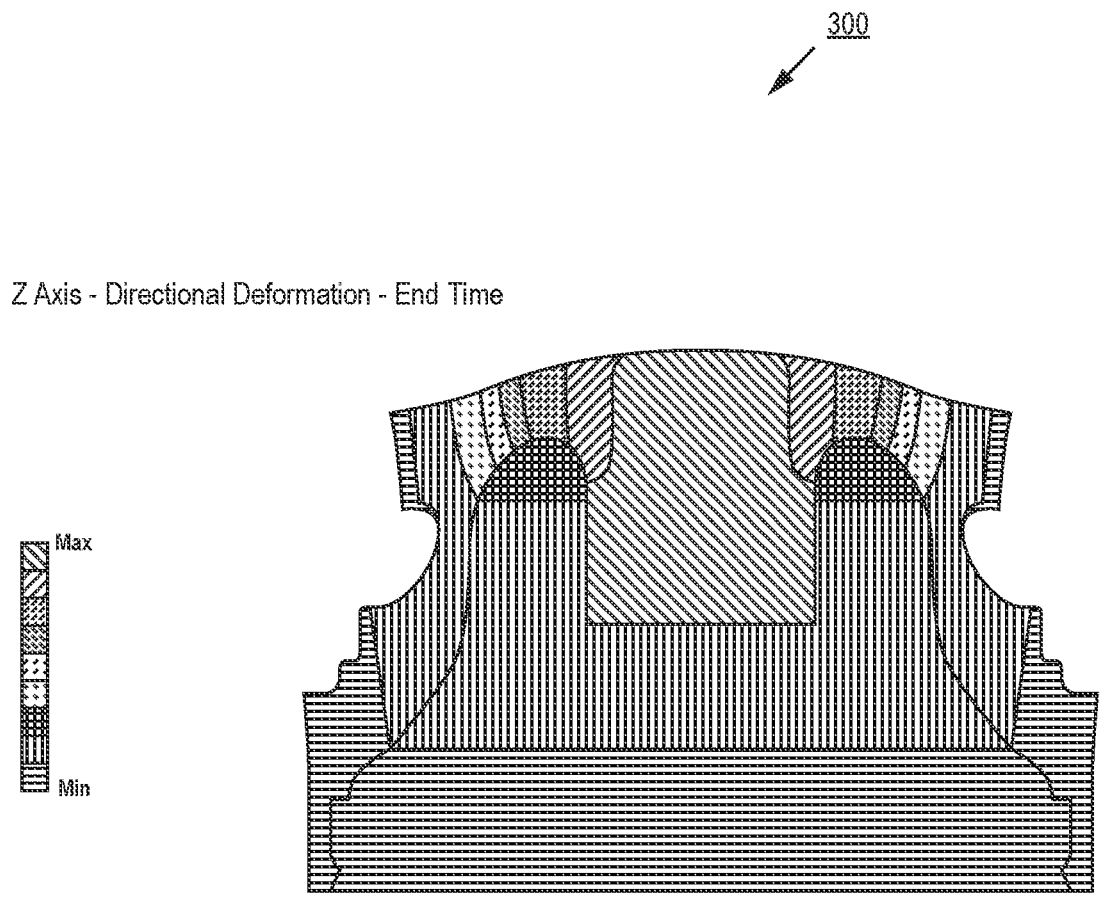
FIG. 3 is a diagram illustrating a FEA diagram depicting direction deformation of a force-compliant element.

FIG. 3 is a FEA diagram (300) depicting direction deformation of a force-compliant element. As is shown in the example of FIG. 3, the force-compliant element has a small displacement at the maximum load and is too stiff (too small displacements) to integrate a hard stop. By adding a spring element (e.g., the spring element (102) of FIG. 1A), the displacement will increase to acceptable levels (reduction of stiffness as illustrated in FIG. 4) so that a hard stop can be integrated into the design of the sensor apparatus.

Figure 4:
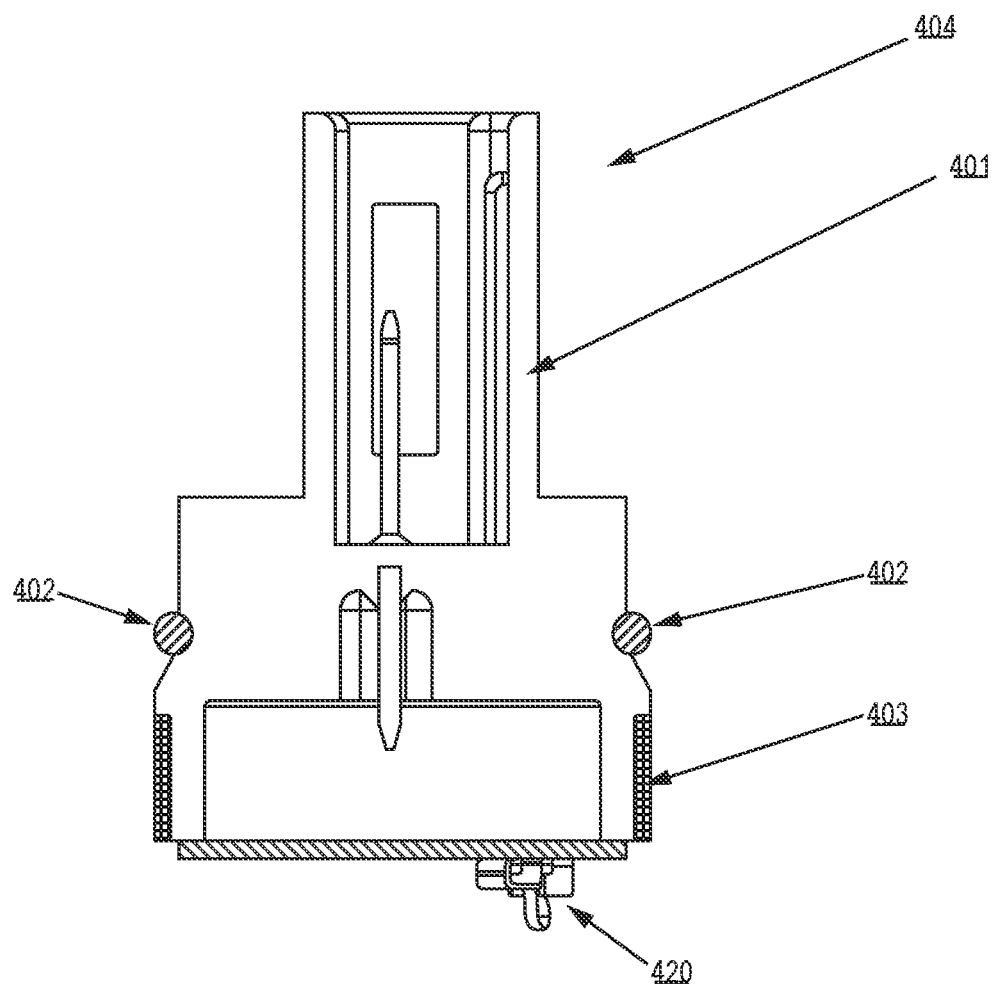
FIG. 4 is a diagram illustrating a cross-section view of a connector assembly, according to at least one embodiment of the present disclosure.
Figure 5:
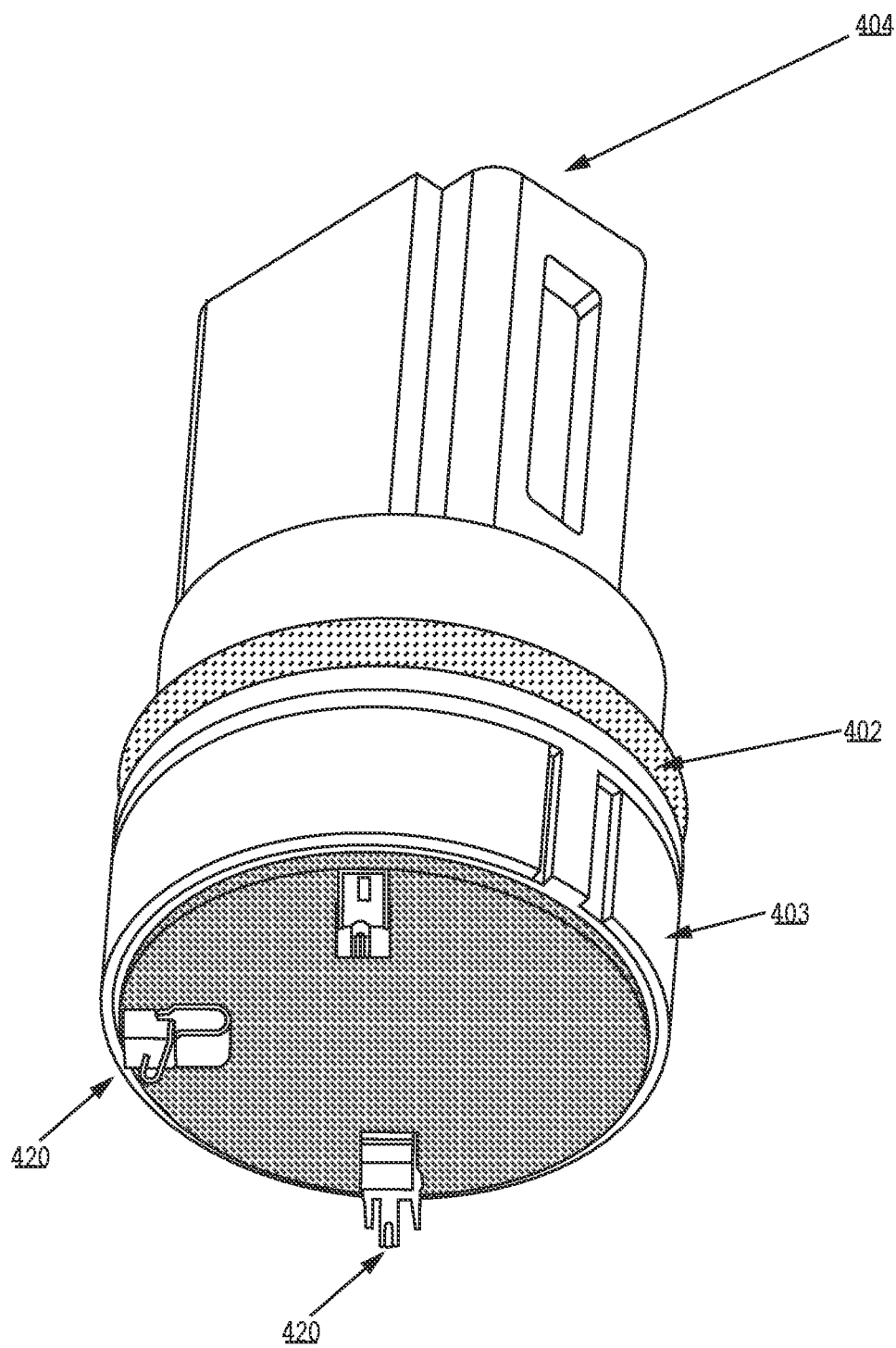
FIG. 5 is a diagram illustrating a view of the connector assembly of FIG. 4, according to at least one embodiment of the present disclosure.

FIG. 4 is a diagram illustrating a cross-section view of a connector assembly (404), according to at least one embodiment of the present disclosure. FIG. 5 is a diagram illustrating a view of the connector assembly (404) of FIG. 4. Referring to FIG. 4, the connector assembly (404) includes a connector (401) and an O-ring (402) around the body of the connector (401). The connector assembly also includes a metal weld ring (403) and electrical connection (420). In a particular embodiment, the weld ring may be flexible and compressible. In other embodiments, the weld ring may be rigid.

Figure 6A:
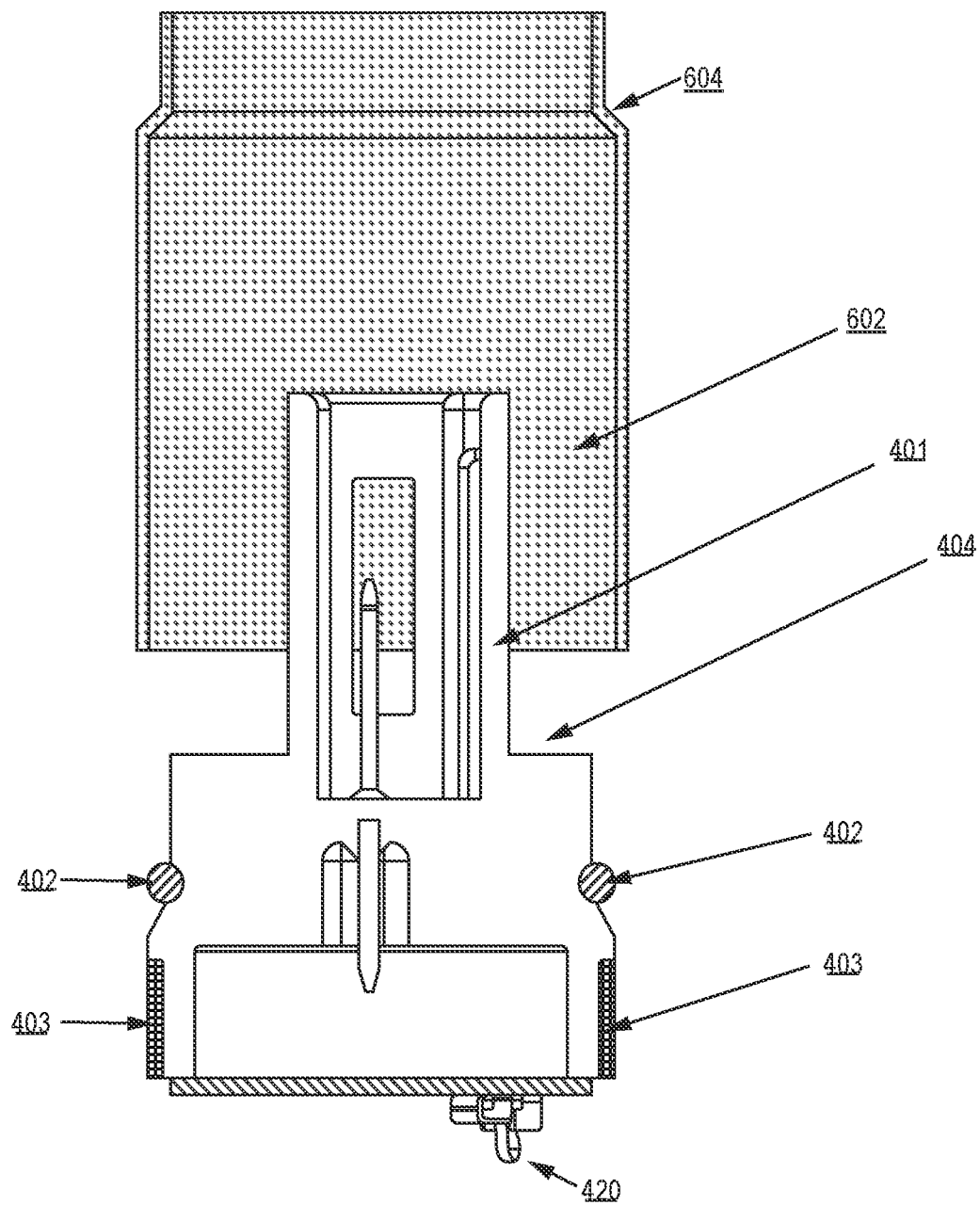
FIG. 6A is a diagram illustrating a cross-section view of the connector assembly of FIG. 4 and FIG. 5 partially inserted into a sensor housing, according to at least one embodiment of the present disclosure.
Figure 6B:
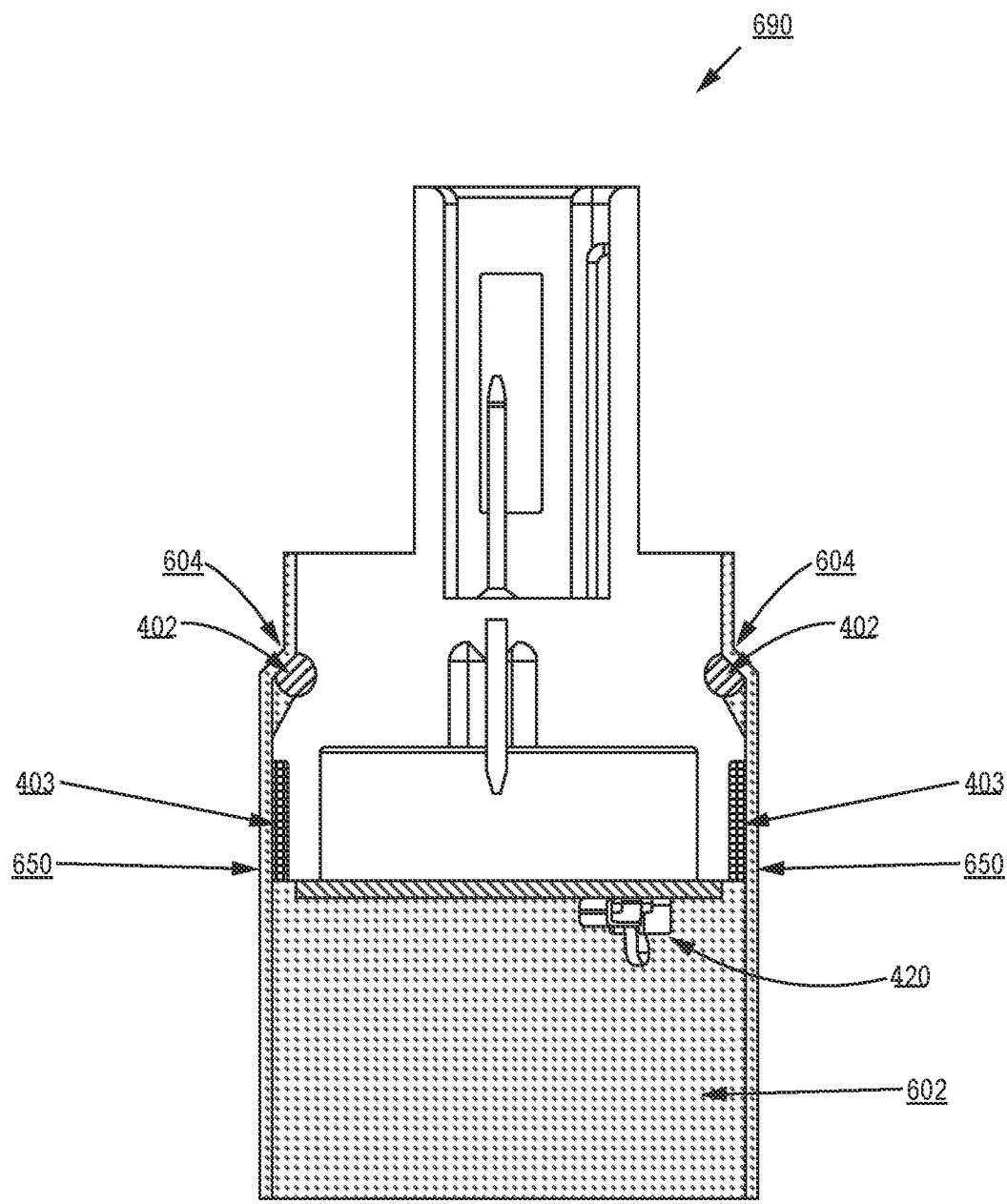
FIG. 6B is a diagram illustrating a cross-section view of a connector housing assembly formed by fully inserting the connector assembly of FIG. 4 and FIG. 5 into the sensor housing of FIG. 6A, according to at least one embodiment of the present disclosure.

FIG. 6A is a diagram illustrating a cross-section view of the connector assembly (404) of FIG. 4 and FIG. 5 partially inserted into a sensor housing (602), according to at least one embodiment of the present disclosure. FIG. 6B is a diagram illustrating a cross-section view of a connector housing assembly (690) formed by fully inserting the connector assembly (404) of FIG. 4 and FIG. 5 into the sensor housing of FIG. 6A, according to at least one embodiment of the present disclosure. Referring to FIG. 6B, an axial force is applied to fully insert the connector assembly (404) into the housing (602) until the O-ring (402) is correctly compressed on the transition to a narrowing section (604) of the sensor housing (602). When fully inserted, the weld ring (403) will reduce gaps between the housing (602) and the connector (401).

In a particular embodiment, the connector assembly (404) and the housing (602) may be rigidly connected at the welding location (650) in the radial direction using a variety of methods including but not limited to (spot) welding, crimping, and gluing. In this embodiment, after the connector assembly (404) and the housing (602) are rigidly connected, the connector (401) cannot move axially anymore due to the fixed weld ring (403).

Figure 7A:
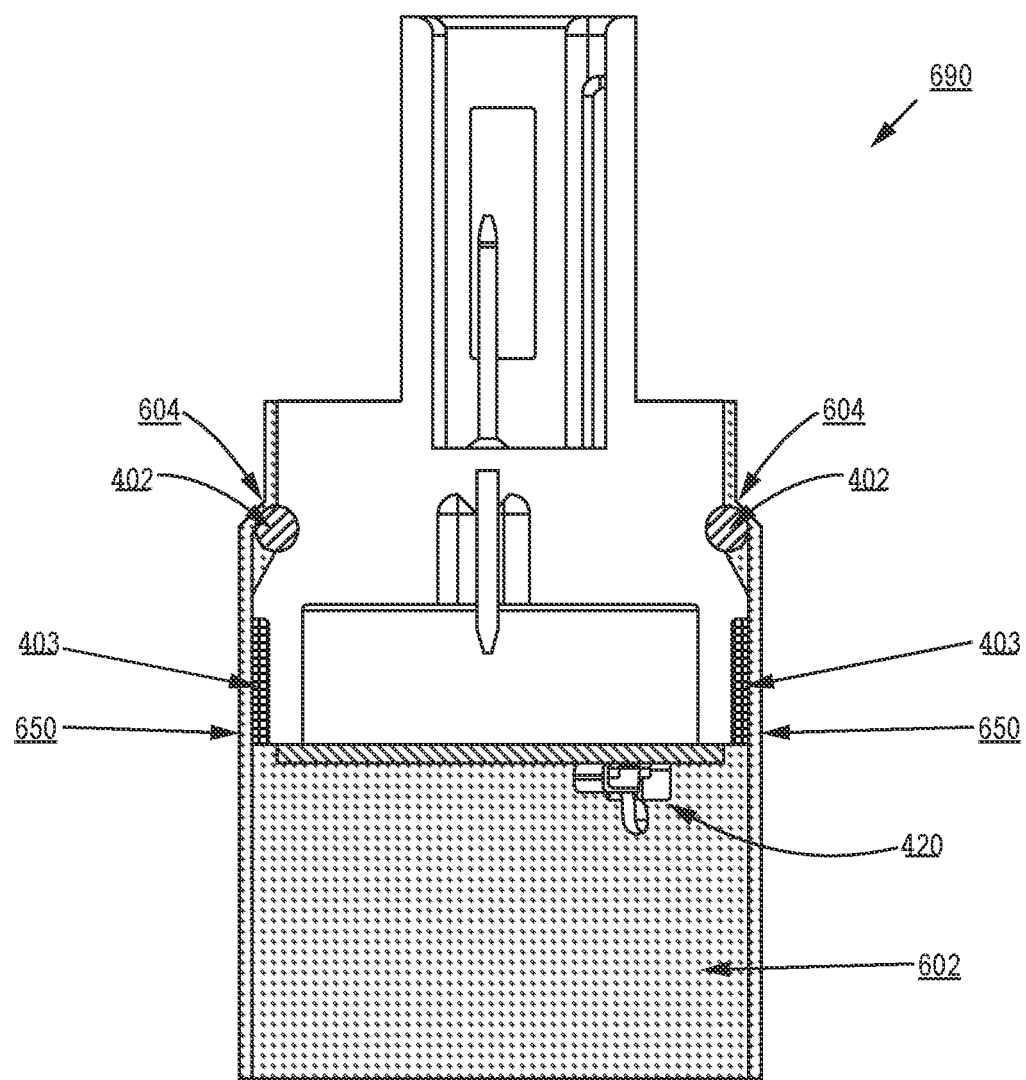
FIG. 7A is a diagram illustrating a cross-section view of the connector housing assembly of FIG. 6B partially inserted into a sensing assembly, according to at least one embodiment of the present disclosure.
Figure 7A:
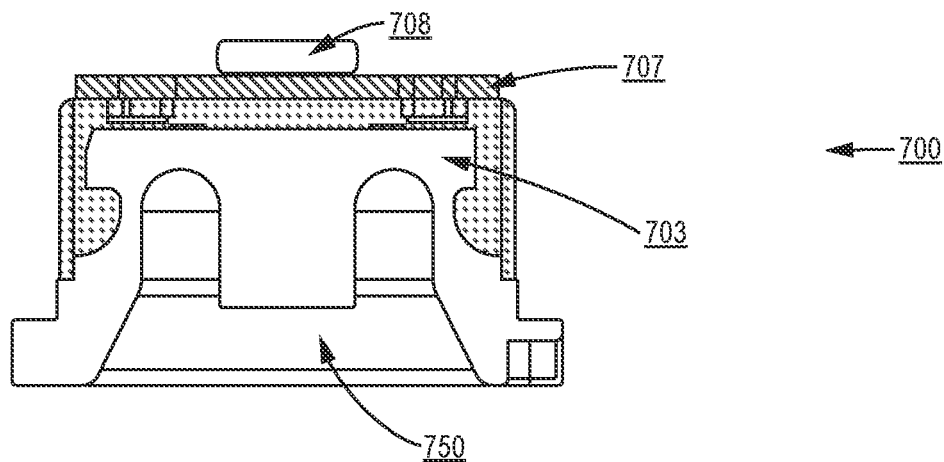
Figure 7B:
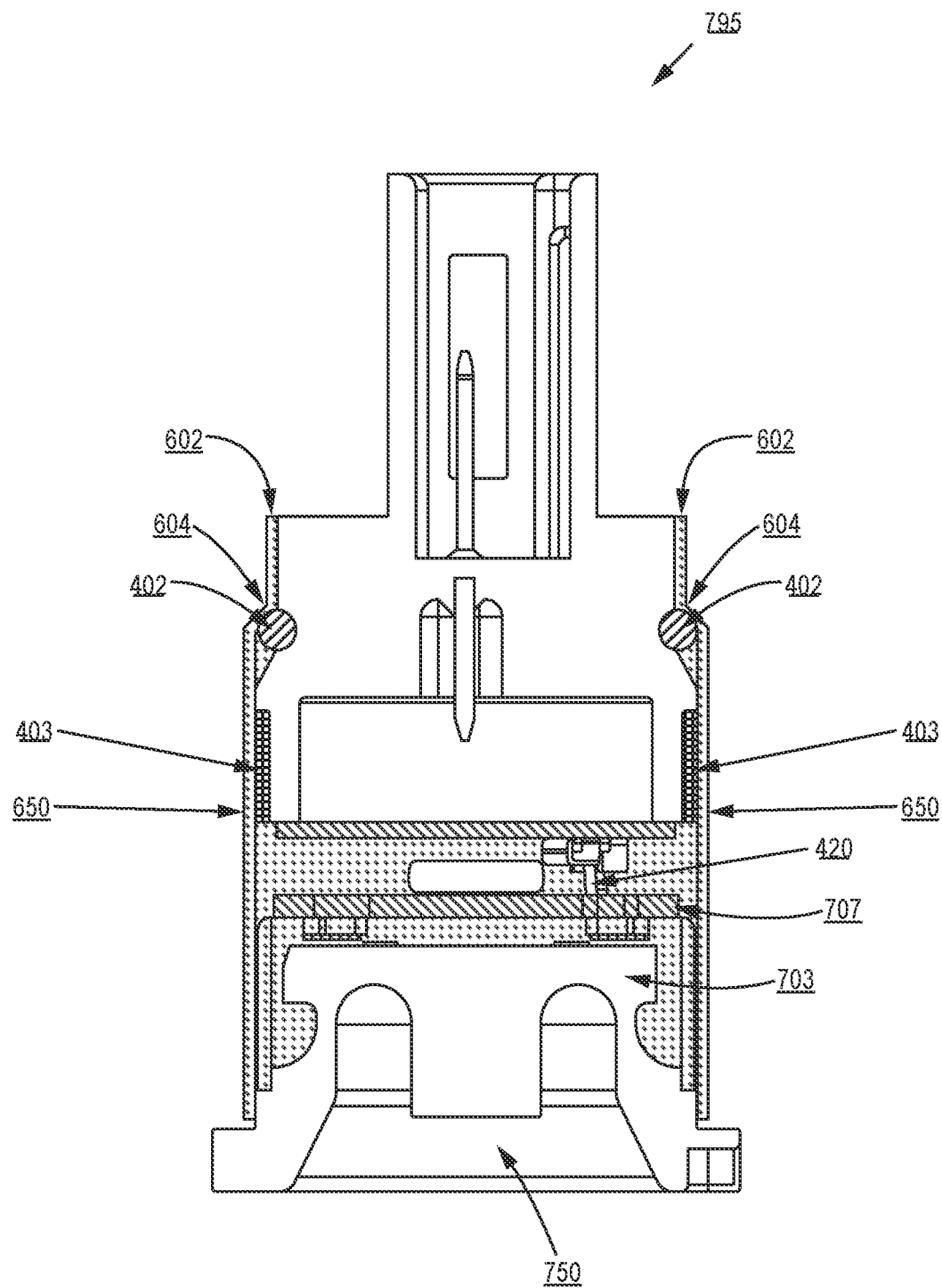
FIG. 7B is a diagram illustrating a cross-section view of an assembled sensor apparatus formed by fully inserting the connector housing assembly into the sensing assembly, according to at least one embodiment of the present disclosure.

FIG. 7A is a diagram illustrating a cross-section view of the connector housing assembly (690) of FIG. 6B partially inserted into a sensing assembly (700), according to at least one embodiment of the present disclosure. FIG. 7B is a diagram illustrating a cross-section view of an assembled sensor apparatus (795) formed by fully inserting the connector housing assembly (690) into the sensing assembly (700), according to at least one embodiment of the present disclosure. The sensing assembly (700) includes a flexible element (750), a force-compliant element (703), a plurality of sensing elements (not shown), a PCB (707), and PCB components and integrated circuit (708). Referring to FIG. 7B, axial force is applied to the connector housing assembly to compress electrical contacts (420) (e.g., springs). In a particular embodiment, the housing assembly (690) may be coupled to the sensing assembly (700) at connection points. For example, the housing assembly (690) may be coupled to the sensing assembly at connection points by welding, crimping, or gluing.

The design of the assembled sensor apparatus of FIG. 7B gives sensor designers the option to decouple the (high) sealing force from the internal stack. Applying the high sealing forces is done on a separate assembly. This reduces risks of failures but in certain products also has the potential to increase accuracy due to minimizing internal parasitic forces. Another key benefit is that sealing can be improved significantly, due to the possibility to increase and stabilize the seal compression. Internal components can potentially also be simplified because they are not load bearing. Field failures can, depending on the sensor design, decrease due to minimalization of internal force. Quality and field returns may be important metrics for safety critical sensors. In the sensor production line, the connector, the environmental seal, and the sensor housing can be received as a single assembly. This assembly can be assembled by a supplier or on a separate machine in the fabrication site. This potentially presents an opportunity for process optimization and/or cost reduction.

Figure 8:
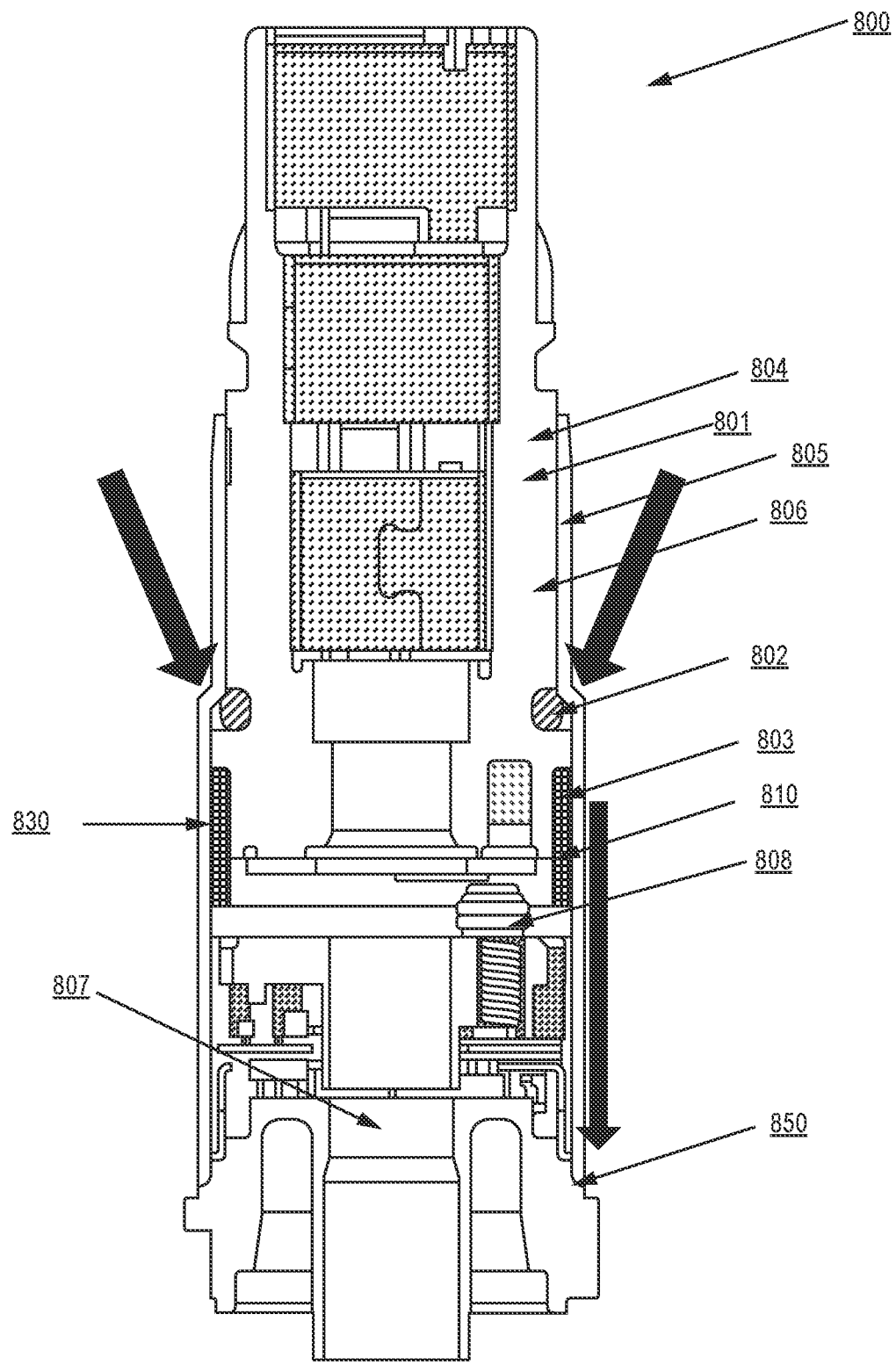
FIG. 8 is a diagram illustrating a cross-section view of an assembled sensor apparatus, according to at least one embodiment of the present disclosure.

FIG. 8 is a diagram illustrating a cross-section view of an assembled sensor apparatus (800), according to at least one embodiment of the present disclosure. In the example of FIG. 8, the assembled sensor apparatus (800) comprises a connector assembly (804) that includes a connector (801), an O-ring (802), and a weld ring (803). The connector assembly is fully inserted into a housing (805), forming a connector housing assembly (806) such that the O-ring (802) is correctly compressed, and the weld ring (803) reduces gaps between the housing (805) and the connector (801). The connector assembly (804) and the housing (805) are rigidly connected at the welding location (830) in the radial direction using a variety of methods including but not limited to (spot) welding, crimping, and gluing. In this embodiment, after the connector assembly (804) and the housing (805) are rigidly connected, the connector (801) cannot move axially anymore due to the fixed weld ring (803). In the example of FIG. 8, the connector housing assembly (806) is inserted into the sensing assembly (807) that includes a PCB (810), such that the electrical contacts (808) are compressed. In a particular embodiment, the connector housing assembly (806) is coupled to the sensing assembly (807) at connection point (850).

By decoupling the (high) force needed to environmentally seal a sensor apparatus and the (low) force needed to electrically connect the connector to the electrical components, both O-ring and electrical compression can be much more controlled. This will greatly extend the possible tolerances between components allowing cost reductions and increasing component selection freedom (e.g., O-rings, spring, etc.). Another benefit is that due to the decoupling of forces, the connector to housing assembly can be significantly more rigid. This can allow higher mounting forces and reduce parasitic effects from wiring harness variation. A second benefit is that the described sensor apparatus of FIGS. 5-8 will reduce forces towards the EMA as the connector can be mechanically decoupled beyond spring forces. Furthermore, the design of the sensor assembly allows for excellent welding capability due to gap reduction by the weld ring.

Figure 9:
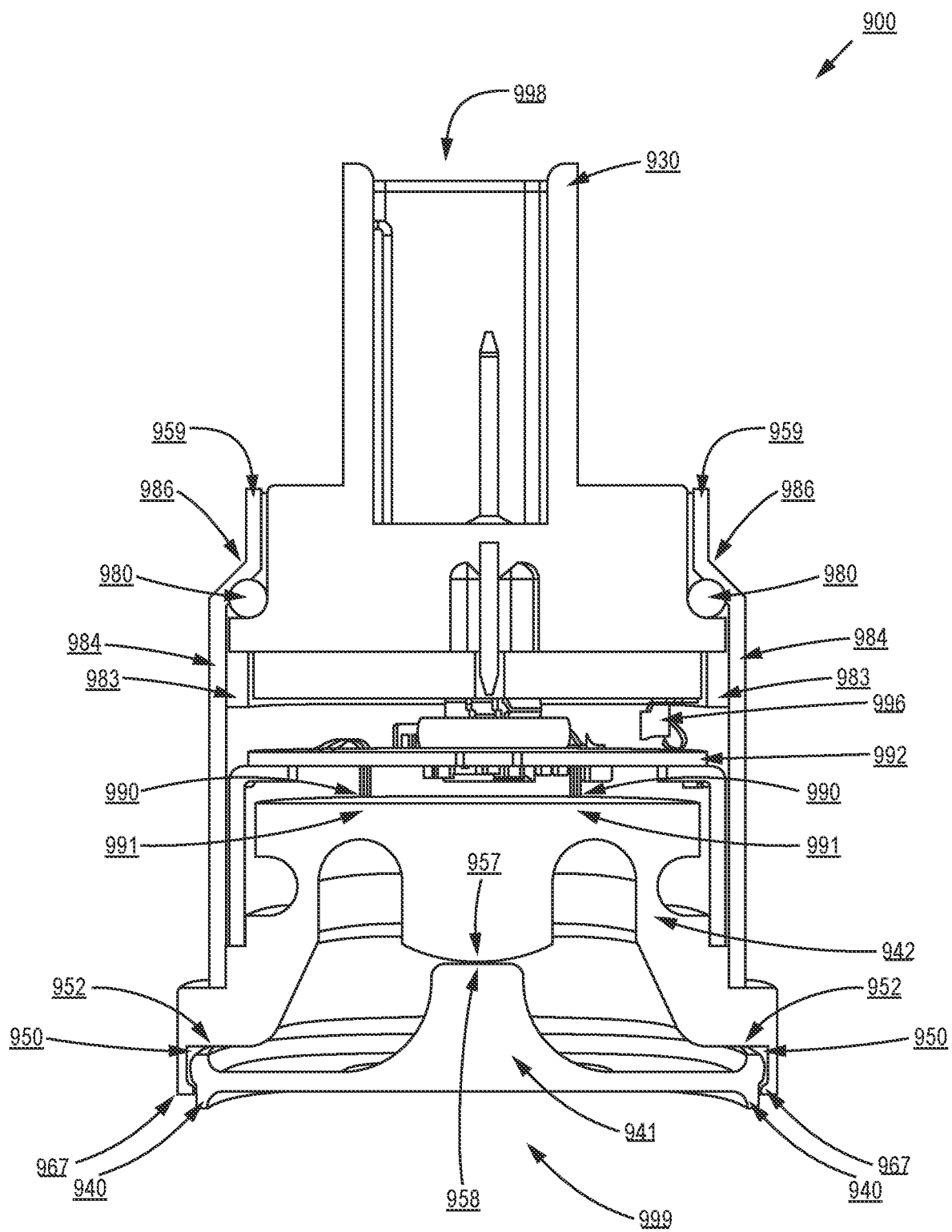
FIG. 9 is a diagram illustrating an isometric cross-section view of an assembled sensor apparatus, according to at least one embodiment of the present disclosure.

FIG. 9 is a diagram illustrating an isometric cross-section view of an assembled sensor apparatus (900), according to at least one embodiment of the present disclosure. The apparatus (900) includes a connector assembly (998) inserted into a sensor housing (959) and coupled to a sensing assembly (999).

In the example of FIG. 9, the connector assembly (998) includes a connector (930) and an O-ring (980) around the body of the connector (930). The connector assembly also includes a weld ring (983). As explained above, an axial force is applied to fully insert the connector assembly (998) into the sensor housing (959) until the O-ring (980) is correctly compressed on the transition to a narrowing portion (986) of the sensor housing (959). When fully inserted, the weld ring (983) will reduce gaps between the sensor housing (959) and the connector (930).

In a particular embodiment, the connector assembly (998) and the sensor housing (959) may be rigidly connected at the welding location (984) in the radial direction using a variety of methods including but not limited to (spot) welding, crimping, and gluing. In this embodiment, after the connector assembly (998) and the sensor housing (959) are rigidly connected, a connector housing assembly is formed in which the connector (930) cannot move axially anymore due to the fixed weld ring (983).

In the assembled force sensor apparatus (900), the sensing assembly (999) is inserted into the connector housing assembly. In the example of FIG. 9, the sensing assembly (999) includes a spring element (941), a force-compliant element (942), a membrane (991), a plurality of sensing elements (990), and a PCB (992). Upon insertion of the sensing assembly (999) into the connector housing assembly, the electrical connection (996) of the connector (930) may be coupled to the PCB (992) of the sensing assembly (999). The force-compliant element (942) has a center portion (957) and an outer portion that includes a ledge (952).

In a particular embodiment, the flexible spring element (941) has an outer diameter (940) and a center portion (958) with the flexible spring element (941) curving from the outer diameter (940) to the center portion (957) of the flexible spring element (941). In this embodiment, the center portion (958) of the flexible spring element (941) is aligned with the center portion (957) of the force-compliant element (942). In the example of FIG. 9, the outer diameter (940) of the flexible spring element (941) is separated from the ledge (952) of the outer portion of the force-compliant element (942) by a space (950). In a particular embodiment, the outer portion (967) of the force-compliant element (942) curves to hold the outer diameter (940) of the flexible spring element (941) in the space (950).

During operation, the flexible spring element (941) is configured to bend in response to a force within a range being applied to the outer diameter (940) of the flexible spring element (941), such that the outer diameter moves within the space towards the ledge (952) as the force is transferred from the outer diameter (940) to the center portion (958) of the flexible spring element (941) and applied to the center portion (957) of the force-compliant element (942) until additional force in excess of the range is applied to the outer diameter (940) causing the outer diameter (940) to contact the ledge (952), at which point, the additional force is applied to the outer portion of the force-compliant element and the sensor housing (959). In this example, the contact between the outer diameter (940) of the flexible spring element (941) and the ledge (952) of the force-compliant element (942) prevents the center portion (958) of the flexible spring element (941) from continuing to move further towards the center portion (957) of the force compliant element (942).

The force-compliant element (942) deforms in response to the application of force from the center portion (958) of the flexible spring element (941). The deformation in the force-compliant element may be measured by the sensing elements (990) through a membrane (991) in the force-compliant element (942). The sensing elements (990) generate one or more signals indicating a degree that the force-compliant element has deformed in response to the application of force from the center portion (958) of the flexible spring element (941). The signals from the sensing elements (990) are provided to components of the PCB (992), which in turn provide an output that is transmitted to the electrical connections of the connector (930).

Figure 10:
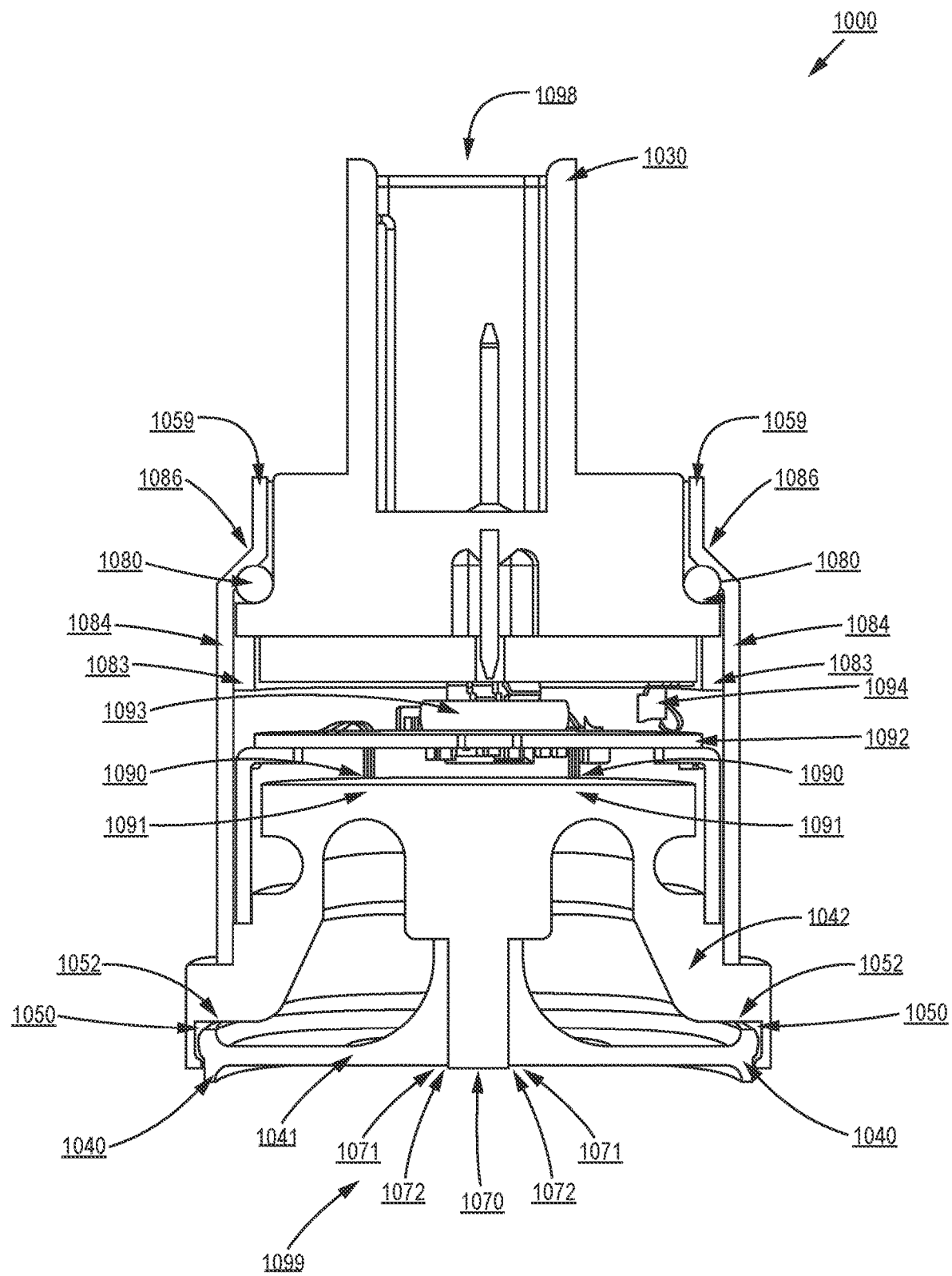
FIG. 10 is a diagram illustrating an isometric cross-section view of an assembled sensor apparatus, according to at least one embodiment of the present disclosure.

FIG. 10 is a diagram illustrating an isometric cross-section view of an assembled sensor apparatus (1000), according to at least one embodiment of the present disclosure. The apparatus (1000) includes a connector assembly (1098) inserted into a sensor housing (1059) and coupled to a sensing assembly (1099).

In the example of FIG. 10, the connector assembly (1098) includes a connector (1030) and an O-ring (1080) around the body of the connector (1030). The connector assembly (1098) also includes a metal weld ring (1083). As explained above, an axial force is applied to fully insert the connector assembly (1030) into the sensor housing (1059) until the O-ring (1080) is correctly compressed against a crimped portion (1086) of the sensor housing (1059). When fully inserted, the weld ring (1083) will reduce gaps between the sensor housing (1059) and the connector (1030).

In a particular embodiment, the connector assembly (1098) and the sensor housing (1059) may be rigidly connected at the welding location (1084) in the radial direction using a variety of methods including but not limited to (spot) welding, crimping, and gluing. In this embodiment, after the connector assembly (1098) and the sensor housing (1059) are rigidly connected, a connector housing assembly is formed in which the connector (1030) cannot move axially anymore due to the fixed weld ring (1083).

In the assembled force sensor apparatus (1000), the sensing assembly (1099) is inserted into the connector housing assembly. In the example of FIG. 10, the sensing assembly (1099) includes a spring element (1041), a force-compliant element (1042), a membrane (1091), a plurality of sensing elements (1090), a PCB (1092), and a PCB component (1093). Upon insertion of the sensing assembly (1099) into the connector housing assembly, the electrical connection (1094) of the connector (1030) may be coupled to the PCB (1092) of the sensing assembly (1099). The force-compliant element (1042) has a center portion (1070) and an outer portion that includes a ledge (1052).

In a particular embodiment, the flexible spring element (1041) has an outer diameter (1040) and a center portion (1071) with the flexible spring element (1041) curving from the outer diameter (1040) to the center portion (1071) of the flexible spring element (1041). In this embodiment, the center portion (1071) of the flexible spring element (1041) is aligned with the center portion (1070) of the force-compliant element (1042). The outer diameter (1040) of the flexible spring element (1041) is separated from the ledge (1052) of the outer portion of the force-compliant element (1042) by a space (1050).

In a particular embodiment, the center portion of the flexible spring element may be coupled to the center portion of the force-compliant element. In the example of FIG. 10, the center portion (1070) of the force-compliant element (1042) extends through the center portion (1071) of the flexible spring element (1041). An outer section (1072) of the center portion (1070) of the force-compliant element (1042) extends beyond the center portion (1071) of the flexible spring element (1041) and the outer section (1072) of the center portion (1070) of the force-compliant element (1042) is deformed and covers the center portion (1071) of the flexible spring element (1041). Because the outer section (1072) is deformed and covers a portion of the center section (1071) of the spring element (1041), the outer section (1072) may hold the center portion (1071) of the spring element (1041) in place relative to the center portion (1070) of the force-compliant element (1042). In the example of FIG. 10, the outer section of the force-compliant element is illustrated as curving inward. However, in a particular embodiment, the outer section of the force-compliant element may be straight, such that the outer section of the force-compliant element does not hold the outer diameter of the flexible spring element in the space.

During operation, the flexible spring element (1041) is configured to bend in response to a force within a range being applied to the outer diameter (1040) of the flexible spring element (1041), such that the outer diameter moves within the space (1050) towards the ledge (1052) as the force is transferred from the outer diameter (1040) to the center portion (1071) of the flexible spring element (1041) and applied to the center portion (1070) of the force-compliant element (1042) until additional force in excess of the range is applied to the outer diameter (1040) causing the outer diameter (1040) to press against the ledge (1052), at which point, the additional force is applied to the outer portion of the force-compliant element and the sensor housing (1059). In this example, the contact between the outer diameter (1040) of the flexible spring element (1041) and the ledge (1052) of the force-compliant element (1042) prevents the center portion (1071) of the flexible spring element (1041) from continuing to compress against the center portion (1070) of the force compliant element (1042).

The force-compliant element (1042) deforms in response to the application of force from the center portion (1071) of the flexible spring element (1041). The deformation in the force-compliant element may be measured by the sensing elements (1090) through a membrane (1091) in the force-compliant element (1042). The sensing elements (1090) generate one or more signals indicating a degree that the force-compliant element has deformed in response to the application of force from the center portion (1071) of the flexible spring element (1041). The signals from the sensing elements (1090) are provided to components of the PCB (1092), which in turn provide an output that is transmitted to the electrical connections of the connector (1030).

Figure 11:
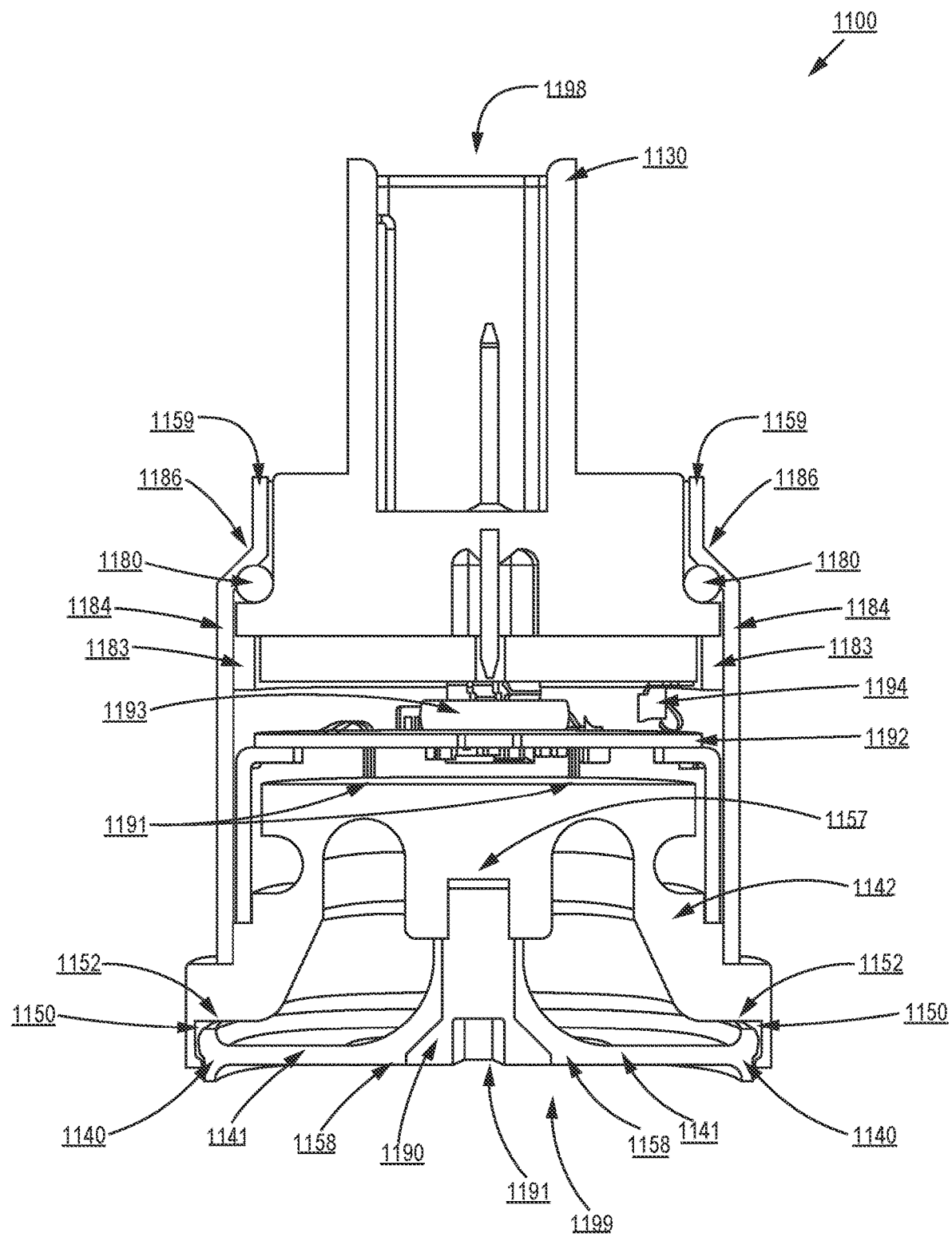
FIG. 11 is a diagram illustrating an isometric cross-section view of an assembled sensor apparatus, according to at least one embodiment of the present disclosure.

FIG. 11 is a diagram illustrating an isometric cross-section view of an assembled sensor apparatus (1100), according to at least one embodiment of the present disclosure. The apparatus (1100) includes a connector assembly (1198) inserted into a sensor housing (1159) and coupled to a sensing assembly (1199).

In the example of FIG. 11, the connector assembly (1198) includes a connector (1130) and an O-ring (1180) around the body of the connector (1130). The connector assembly also includes a metal weld ring (1183). As explained above, an axial force is applied to fully insert the connector assembly (1198) into the sensor housing (1159) until the O-ring (1180) is correctly compressed against a crimped portion (1186) of the sensor housing (1159). When fully inserted, the weld ring (1183) will reduce gaps between the sensor housing (1159) and the connector (1130).

In a particular embodiment, the connector assembly (1198) and the sensor housing (1159) may be rigidly connected at the welding location (1184) in the radial direction using a variety of methods including but not limited to (spot) welding, crimping, and gluing. In this embodiment, after the connector assembly (1198) and the sensor housing (1159) are rigidly connected, a connector housing assembly is formed in which the connector (1130) cannot move axially anymore due to the fixed weld ring (1183).

In the assembled force sensor apparatus (1100), the sensing assembly (1199) is inserted into the connector housing assembly. In the example of FIG. 11, the sensing assembly (1199) includes a flexible spring element (1141), a force-compliant element (1142), a membrane (1191), a plurality of sensing elements (1190), a PCB (1192), and a PCB component (1193). Upon insertion of the sensing assembly (1199) into the connector housing assembly, the electrical connection (1194) of the connector (1130) may be coupled to the PCB (1192) of the sensing assembly (1199). The force-compliant element (1142) has a center portion (1157) and an outer portion that includes a ledge (1152).

In a particular embodiment, the flexible spring element (1141) has an outer diameter (1140) and a center portion (1158) with the flexible spring element (1141) curving from the outer diameter (1140) to the center portion (1157) of the flexible spring element (1141). In this embodiment, the center portion (1158) of the flexible spring element (1141) is aligned with the center portion (1157) of the force-compliant element (1142). The outer diameter (1140) of the flexible spring element (1141) is separated from the ledge (1152) of the outer portion of the force-compliant element (1142) by a space (1150). In the example of FIG. 11, the outer section of the force-compliant element is illustrated as curving inward. However, in a particular embodiment, the outer section of the force-compliant element may be straight, such that the outer section of the force-compliant element does not hold the outer diameter of the flexible spring element in the space.

In a particular embodiment, the center portion (1158) of the flexible spring element (1141) is coupled to the center portion (1157) of the force-compliant element (1142). In the example of FIG. 11, the sensing assembly (1199) further includes a joinder component (1190) that extends through and couples together the center portion (1158) of the flexible spring element (1141) and the center portion (1157) of the force-compliant element (1142). In a particular embodiment, the joinder component (1190) may be fastened to the force-compliant element (1142) using a screw (not pictured).

During operation, the flexible spring element (1141) is configured to bend in response to a force within a range being applied to the outer diameter (1140) of the flexible spring element (1141), such that the outer diameter moves within the space towards the ledge (1152) as the force is transferred from the outer diameter (1140) to the center portion (1158) of the flexible spring element (1141) and applied to the center portion (1157) of the force-compliant element (1142) until additional force in excess of the range is applied to the outer diameter (1140) causing the outer diameter (1140) to contact the ledge (1152), at which point, the additional force is applied to the outer portion of the force-compliant element and the sensor housing (1159). In this example, the contact between the outer diameter (1140) of the flexible spring element (1141) and the ledge (1152) of the force-compliant element (1142) prevents the center portion (1158) of the flexible spring element (1141) from continuing to press further towards the center portion (1157) of the force compliant element (1142).

The force-compliant element (1142) deforms in response to the application of force from the center portion (1158) of the flexible spring element (1141). The deformation in the force-compliant element may be measured by the sensing elements (1090) through a membrane (1191) in the force-compliant element (1142). The sensing elements (1190) generate one or more signals indicating a degree that the force-compliant element has deformed in response to the application of force from the center portion (1158) of the flexible spring element (1141). The signals from the sensing elements (1190) are provided to components of the PCB (1192), which in turn provide an output that is transmitted to the electrical connections of the connector (1130).

Figure 12:
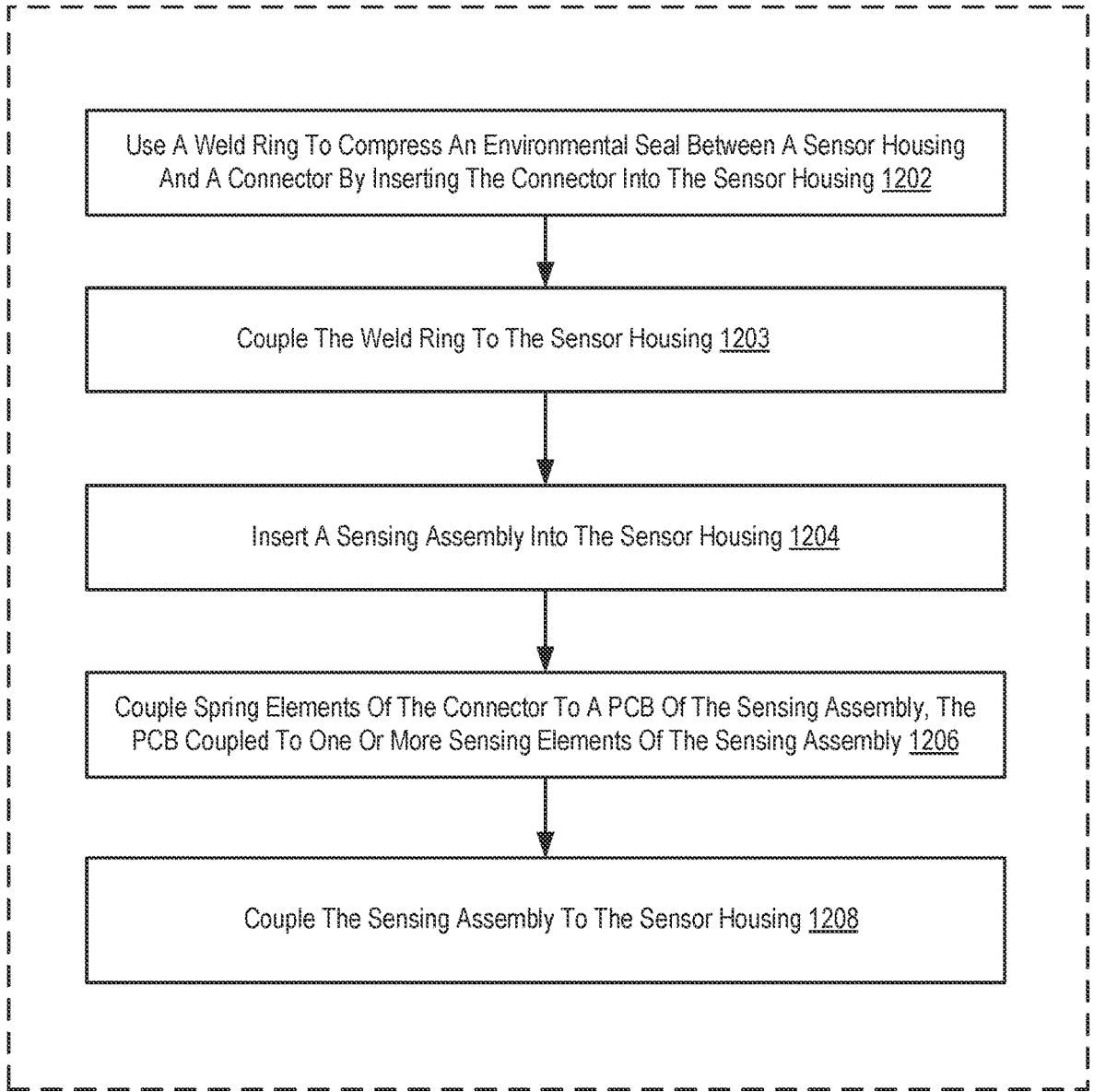
FIG. 12 is a flowchart to illustrate an implementation of a method for assembling a force sensor apparatus, according to at least one embodiment of the present disclosure.

FIG. 12 is a flowchart to illustrate an implementation of a method for assembling a force sensor apparatus, according to at least one embodiment of the present disclosure, that includes using (1202) a weld ring (e.g., the weld ring (983) of FIG. 9) to compress an environmental seal (e.g., the o-ring (980) of FIG. 9) between a sensor housing (e.g., the sensor housing (959) of FIG. 9) and a connector (e.g., the connector (930) of FIG. 9) by inserting the connector into the sensor housing. In the example of FIG. 12, the connector has one or more electrical connections. Using (1202) a weld ring to compress an environmental seal between a sensor housing and a connector by inserting the connector into the sensor housing may be carried out by pushing the connector until the environmental seal is pressed against a narrowed portion of the sensor housing.

The method of FIG. 12 includes coupling (1203) the weld ring to the sensor housing. Coupling (1203) the weld ring to the sensor housing may be carried out by welding, crimping, and gluing.

The method of FIG. 12 also includes inserting (1204) a sensing assembly (e.g., the sensing assembly (990) of FIG. 9) into the sensor housing. Inserting (1204) a sensing assembly into the sensor housing may be carried out by aligning the sensing assembly with the sensor housing.

In the example of FIG. 12, the sensing assembly may include a force-compliant element having a center portion and an outer portion. The sensing assembly may also include one or more sensing elements coupled to the center portion of the force-compliant element. In the example of FIG. 12, the force-compliant element deforms in response to an application of force to the force-compliant element and the one or more sensing elements generate one or more signals indicating a degree that the force-compliant element has deformed in response to the application of force to the force-compliant element.

The method of FIG. 12 also includes coupling (1206) spring elements of the connector to a printed circuit board (PCB) of the sensing assembly. In the example of FIG. 12, the PCB is coupled to one or more sensing elements of the sensing assembly. Coupling (1206) the spring elements of the connector to a PCB may be carried out by pushing the sensing assembly until the spring elements of the connector and the PCB of the sensing assembly are connected.

In addition, the method of FIG. 12 also includes coupling (1208) the sensing assembly to the sensor housing. Coupling (1208) the sensing assembly to the sensor housing may be carried out by welding, gluing, and crimping.

As explained above, the weld ring may be used to decouple the (high) force needed to environmentally seal a sensor apparatus and the (low) force needed to electrically connect the connector to the electrical components, so that both environmental sealing and electrical compression can be much more controlled. This may greatly extend the possible tolerances between components allowing cost reductions and increasing component selection freedom (e.g., O-rings, spring, etc.). Another benefit is that due to the decoupling of forces, the connector to housing assembly can be significantly more rigid. This can allow higher mounting forces and reduce parasitic effects from wiring harness variation. Furthermore, the design of the sensor assembly allows for improved welding capability due to gap reduction by the weld ring.

Advantages and features of the present disclosure can be further described by the following statements:

1. A force sensor apparatus comprising a sensor housing and a sensing assembly, the sensing assembly including: a force-compliant element having a center portion and an outer portion; one or more sensing elements coupled to the center portion of the force-compliant element; and a flexible spring element having an outer diameter and a center portion, the flexible spring element curving from the outer diameter to the center portion of the flexible spring element; the center portion of the flexible spring element aligned with the center portion of the force-compliant element; the outer diameter separated from a ledge of the outer portion of the force-compliant element by a space; the flexible spring element configured to bend in response to a force within a range being applied to the outer diameter, such that the outer diameter moves within the space towards the ledge as the force is transferred from the outer diameter to the center portion of the flexible spring element and applied to the center portion of the force-compliant element until additional force in excess of the range is applied to the outer diameter causing the outer diameter to press against the ledge, at which point, the additional force is applied to the outer portion of the force-compliant element and the sensor housing; the force-compliant element deforms in response to the application of force from the center portion of the flexible spring element; and the one or more sensing elements generate one or more signals indicating a degree that the force-compliant element has deformed in response to the application of force from the center portion of the flexible spring element.

2. The force sensor apparatus of statement 1, wherein contact between the outer diameter of the flexible spring element and the ledge of the force-compliant element prevents the center portion of the flexible spring element from continuing to further compress against the center portion of the force compliant element.

3. The force sensor apparatus of statements 1 or 2, wherein the sensing assembly includes a disc having a first surface that is coupled to an application specific interface and having a second surface that is coupled to the outer diameter of the flexible spring element; wherein application of the force from the application specific interface to the first surface of the disc transfers to the outer diameter of the flexible spring element.

4. The force sensor apparatus of any of statements 1-3, wherein an outer section of the force-compliant element curves inward to hold the outer diameter of the flexible spring element in the space.

5. The force sensor apparatus of any of statements 1-4, wherein the center portion of the flexible spring element is coupled to the center portion of the force-compliant element.

6. The force sensor apparatus of any of statements 1-5, wherein the center portion of the force-compliant element extends through the center portion of the flexible spring element.

7. The force sensor apparatus of any of statements 1-6, wherein an outer section of the center portion of the force-compliant element extends beyond the center portion of the flexible spring element, the outer section of the center portion of the force-compliant element is deformed and covers the center portion of the flexible spring element.

8. The force sensor apparatus of any of statements 1-7, further comprising a joinder component that extends through and couples together the center portion of the flexible spring element and the center portion of the force-compliant element.

9. The force sensor apparatus of any of statements 1-8, further comprising a connector assembly coupled to the sensor housing, the connector assembly including: a connector inserted into the sensor housing, the connector including one or more spring elements for electrical connections to the PCB which is coupled to the one or more sensing elements; and a weld ring that compresses an environmental seal between the sensor housing and the connector.

10. A force sensor apparatus comprising: a sensor housing; a connector inserted in the sensor housing; a weld ring that compresses an environmental seal between the sensor housing and the connector; and a sensing assembly coupled to the sensor housing, the sensing assembly including: a force-compliant element having a center portion and an outer portion; and one or more sensing elements coupled to the center portion of the force-compliant element; the force-compliant element deforms in response to an application of force to the force-compliant element; and the one or more sensing elements generate one or more signals indicating a degree that the force-compliant element has deformed in response to the application of force to the force-compliant element.

11. The force sensor apparatus of statement 10 wherein the sensing assembly further includes: a flexible spring element having an outer diameter and a center portion, the flexible spring element curving from the outer diameter to the center portion of the flexible spring element; the center portion of the flexible spring element aligned with the center portion of the force-compliant element; the outer diameter separated from a ledge of the outer portion of the force-compliant element by a space; the flexible spring element configured to bend in response to a force within a range being applied to the outer diameter, such that the outer diameter moves within the space towards the ledge as the force is transferred from the outer diameter to the center portion of the flexible spring element and applied to the center portion of the force-compliant element until additional force in excess of the range is applied to the outer diameter causing the outer diameter to press against the ledge, at which point, the additional force is applied to the outer portion of the force-compliant element and the sensor housing.

12. The force sensor apparatus of statements 10 or 11, wherein contact between the outer diameter of the flexible spring element and the ledge of the force-compliant element prevents the center portion of the flexible spring element from continuing to move further towards the center portion of the force compliant element.

13. The force sensor apparatus of any of statements 10-12, wherein the sensing assembly includes a disc having a first surface that is coupled to an application specific interface and having a second surface that is coupled to the outer diameter of the flexible spring element; wherein application of the force from the application specific interface to the first surface of the disc transfers to the outer diameter of the flexible spring element.

14. The force sensor apparatus of any of statements 10-13, wherein an outer section of the force-compliant element curves inward to hold the outer diameter of the flexible spring element in the space.

15. The force sensor apparatus of any of statements 10-14, wherein the center portion of the flexible spring element is coupled to the center portion of the force-compliant element.

16. The force sensor apparatus of any of statements 10-15, wherein the center portion of the force-compliant element extends through the center portion of the flexible spring element.

17. The force sensor apparatus of any of statements 10-16, wherein an outer section of the center portion of the force-compliant element extends beyond the center portion of the flexible spring element, the outer section of the center portion of the force-compliant element is deformed and covers the center portion of the flexible spring element.

18. The force sensor apparatus of any of statements 10-17, further comprising a joiner component that extends through and couples together the center portion of the flexible spring element and the center portion of the force-compliant element.

19. A method of assembling a force sensor apparatus, the method comprising: using a weld ring to compress an environmental seal between a sensor housing and a connector by inserting the connector into the sensor housing, the connector having one or more electrical connections; coupling the weld ring to the sensor housing; inserting a sensing assembly into the sensor housing, the sensing assembly including: a force-compliant element having a center portion and an outer portion; and one or more sensing elements coupled to the center portion of the force-compliant element; the force-compliant element deforms in response to an application of force to the force-compliant element; and the one or more sensing elements generate one or more signals indicating a degree that the force-compliant element has deformed in response to the application of force to the force-compliant element; coupling the one or more sensing element to the one or more electrical connections of the connector; and coupling the sensing assembly to the sensor housing.

20. The method of statement 19, wherein the sensing assembly further includes: a flexible spring element having an outer diameter and a center portion, the flexible spring element curving from the outer diameter to the center portion of the flexible spring element; the center portion of the flexible spring element aligned with the center portion of the force-compliant element; the outer diameter separated from a ledge of the outer portion of the force-compliant element by a space; the flexible spring element configured to bend in response to a force within a range being applied to the outer diameter, such that the outer diameter moves within the space towards the ledge as the force is transferred from the outer diameter to the center portion of the flexible spring element and applied to the center portion of the force-compliant element until additional force in excess of the range is applied to the outer diameter causing the outer diameter to press against the ledge, at which point, the additional force is applied to the outer portion of the force-compliant element and the sensor housing.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

What is claimed is:

1. A force sensor apparatus comprising a sensor housing and a sensing assembly, the sensing assembly including:
   a force-compliant element having a center portion and an outer portion;
   one or more sensing elements coupled to the center portion of the force-compliant element; and
   a flexible spring element having an outer diameter and a center portion, the flexible spring element curving from the outer diameter to the center portion of the flexible spring element;
   the center portion of the flexible spring element aligned with the center portion of the force-compliant element;
   the outer diameter separated from a ledge of the outer portion of the force-compliant element by a space;
   the flexible spring element bends in response to a force within a range being applied to the outer diameter, such that the outer diameter moves within the space towards the ledge as the force is transferred from the outer diameter to the center portion of the flexible spring element and applied to the center portion of the force-compliant element until additional force in excess of the range is applied to the outer diameter causing the outer diameter to press against the ledge, at which point, the additional force is applied to the outer portion of the force-compliant element and the sensor housing;
   the force-compliant element deforms in response to the application of force from the center portion of the flexible spring element; and
   the one or more sensing elements generate one or more signals indicating a degree that the force-compliant element has deformed in response to the application of force from the center portion of the flexible spring element.

2. The force sensor apparatus of claim 1 wherein contact between the outer diameter of the flexible spring element and the ledge of the force-compliant element prevents the center portion of the flexible spring element from continuing to further compress against the center portion of the force-compliant element.

3. The force sensor apparatus of claim 1 wherein the sensing assembly includes a disc having a first surface that is coupled to an application specific interface and having a second surface that is coupled to the outer diameter of the flexible spring element; wherein application of the force from the application specific interface to the first surface of the disc transfers to the outer diameter of the flexible spring element.

4. The force sensor apparatus of claim 1 wherein an outer section of the force-compliant element curves inward to hold the outer diameter of the flexible spring element in the space.

5. The force sensor apparatus of claim 1 wherein the center portion of the flexible spring element is coupled to the center portion of the force-compliant element.

6. The force sensor apparatus of claim 1 wherein the center portion of the force-compliant element extends through the center portion of the flexible spring element.

7. The force sensor apparatus of claim 6 wherein an outer section of the center portion of the force-compliant element extends beyond the center portion of the flexible spring element, the outer section of the center portion of the force-compliant element is deformed and covers the center portion of the flexible spring element.

8. The force sensor apparatus of claim 1 further comprising a joinder component that extends through and couples together the center portion of the flexible spring element and the center portion of the force-compliant element.

9. The force sensor apparatus of claim 1 further comprising a connector assembly coupled to the sensor housing, the connector assembly including:
a connector inserted into the sensor housing, the connector including one or more spring elements for electrical connections to a printed circuit board (PCB) which is coupled to the one or more sensing elements; and
a weld ring that compresses an environmental seal between the sensor housing and the connector.

10. A force sensor apparatus comprising:
a sensor housing;
a connector inserted in the sensor housing;
a weld ring that compresses an environmental seal between the sensor housing and the connector; and
a sensing assembly coupled to the sensor housing, the sensing assembly including:
a force-compliant element having a center portion and an outer portion; and
one or more sensing elements coupled to the center portion of the force-compliant element;
a flexible spring element having an outer diameter and a center portion, the flexible spring element curving from the outer diameter to the center portion of the flexible spring element;
the center portion of the flexible spring element aligned with the center portion of the force-compliant element;
the outer diameter separated from a ledge of the outer portion of the force-compliant element by a space;
the flexible spring element bends in response to a force within a range being applied to the outer diameter, such that the outer diameter moves within the space towards the ledge as the force is transferred from the outer diameter to the center portion of the flexible spring element and applied to the center portion of the force-compliant element until additional force in excess of the range is applied to the outer diameter causing the outer diameter to press against the ledge, at which point, the additional force is applied to the outer portion of the force-compliant element and the sensor housing;
the force-compliant element deforms in response to an application of force to the force-compliant element; and
the one or more sensing elements generate one or more signals indicating a degree that the force-compliant element has deformed in response to the application of force to the force-compliant element.

11. The force sensor apparatus of claim 10, wherein contact between the outer diameter of the flexible spring element and the ledge of the force-compliant element prevents the center portion of the flexible spring element from continuing to move further towards the center portion of the force-compliant element.

12. The force sensor apparatus of claim 10, wherein the sensing assembly includes a disc having a first surface that is coupled to an application specific interface and having a second surface that is coupled to the outer diameter of the flexible spring element; wherein application of the force from the application specific interface to the first surface of the disc transfers to the outer diameter of the flexible spring element.

13. The force sensor apparatus of claim 10, wherein an outer section of the force-compliant element curves inward to hold the outer diameter of the flexible spring element in the space.

14. The force sensor apparatus of claim 10, wherein the center portion of the flexible spring element is coupled to the center portion of the force-compliant element.

15. The force sensor apparatus of claim 10, wherein the center portion of the force-compliant element extends through the center portion of the flexible spring element.

16. The force sensor apparatus of claim 15 wherein an outer section of the center portion of the force-compliant element extends beyond the center portion of the flexible spring element, the outer section of the center portion of the force-compliant element is deformed and covers the center portion of the flexible spring element.

17. The force sensor apparatus of claim 10 further comprising a joinder component that extends through and couples together the center portion of the flexible spring element and the center portion of the force-compliant element.

18. A method of assembling a force sensor apparatus, the method comprising:
inserting a connector into a sensor housing, the connector having spring elements;
inserting a sensing assembly into the sensor housing, the sensing assembly including:
a force-compliant element having a center portion and an outer portion; and
one or more sensing elements coupled to the center portion of the force-compliant element and a printed circuit board (PCB);
the force-compliant element deforms in response to an application of force to the force-compliant element;
the one or more sensing elements generate one or more signals indicating a degree that the force-compliant element has deformed in response to the application of force to the force-compliant element; and
a flexible spring element having an outer diameter and a center portion, the flexible spring element curving from the outer diameter to the center portion of the flexible spring element;
the center portion of the flexible spring element aligned with the center portion of the force-compliant element;
the outer diameter separated from a ledge of the outer portion of the force-compliant element by a space;
the flexible spring element bends in response to a force within a range being applied to the outer diameter, such that the outer diameter moves within the space towards the ledge as the force is transferred from the outer diameter to the center portion of the flexible spring element and applied to the center portion of the force-compliant element until additional force in excess of the range is applied to the outer diameter causing the outer diameter to press against the ledge, at which point, the additional force is applied to the outer portion of the force-compliant element and the sensor housing;

coupling the spring elements of the connector to a printed circuit board (PCB) of the sensing assembly; and
coupling the sensing assembly to the sensor housing.

\* \* \* \* \*